US008321288B1

(12) United States Patent
Rodriguez et al.

(10) Patent No.: US 8,321,288 B1
(45) Date of Patent: Nov. 27, 2012

(54) MEDIA ASSET MANAGEMENT SYSTEM

(75) Inventors: John Rodriguez, Capitola, CA (US); Patrick Longneker, Santa Cruz, CA (US); Shekhar Kirani, Capitola, CA (US)

(73) Assignee: Syniverse ICX Corporation, Tampa, FL (US)

( * ) Notice: Subject to any disclaimer, the term of this patent is extended or adjusted under 35 U.S.C. 154(b) by 1190 days.

(21) Appl. No.: 11/999,092

(22) Filed: Dec. 3, 2007

Related U.S. Application Data

(62) Division of application No. 09/814,159, filed on Mar. 20, 2001, now Pat. No. 7,305,354.

(51) Int. Cl.
*G06Q 30/00* (2012.01)
(52) U.S. Cl. .......................... 705/26; 705/27
(58) Field of Classification Search ............... 705/26, 705/27
See application file for complete search history.

(56) References Cited

U.S. PATENT DOCUMENTS

| | | | |
|---|---|---|---|
| 4,443,786 A | 4/1984 | Hammerling et al. | |
| 4,992,887 A | 2/1991 | Aragaki | |
| 5,067,029 A | 11/1991 | Takahashi | |
| 5,095,480 A * | 3/1992 | Fenner | 370/238 |
| 5,159,592 A * | 10/1992 | Perkins | 370/338 |
| 5,172,227 A | 12/1992 | Tsai et al. | |
| 5,249,053 A | 9/1993 | Jain | |
| 5,412,427 A | 5/1995 | Rabbani et al. | |
| 5,526,047 A | 6/1996 | Sawanobori | |
| 5,548,789 A | 8/1996 | Nakanura | |
| 5,552,824 A | 9/1996 | DeAngelis et al. | |

(Continued)

FOREIGN PATENT DOCUMENTS

EP 0763943 A2 3/1997

(Continued)

OTHER PUBLICATIONS

Wasserman, Digital Photo Processing Speeds News of That Wonderful Newborn Scanned onto a Disk, A Baby's Photo can be E-mailed or Put on the Web. Digital Cameras offer a shortcut, Elizabeth Wasserman. Philadelphia Inquirer. Philadelphia, Pa.: Jul. 16, 1998. p. F.6, Downloaded from Proquestdirect on the Internet on Jul. 30, 2011, 4 Pages.*

(Continued)

*Primary Examiner* — James Zurita
(74) *Attorney, Agent, or Firm* — Blakely, Sokoloff, Taylor & Zafman LLP; Judith A. Szepesi

(57) ABSTRACT

An asset management system is described that tracks in real-time any metric that a carrier requires pertaining to media assets within a network. In addition to tracking per-asset information relating to usage and air time, the system tracks information pertaining to individual object types (e.g., document, digital image, audio file, streaming media, or the like) as well as specific objects themselves (e.g., individual documents, photos, and the like, on a per-file or named basis). This information can be tracked against the various users and their individual devices (used to access a network). In this manner, the system can provide metrics relating to not only data size and air time, but also metrics about object types (e.g., digital image type) and specific objects (e.g., specific file transferred) that have passed through the network. Based on these various metrics that the asset management system can track, the system generates reports that are transmitted back in real-time to carriers and their e-commerce partners for implementing the various pricing schemes required for supporting their business or revenue models.

17 Claims, 12 Drawing Sheets

U.S. PATENT DOCUMENTS

| | | |
|---|---|---|
| 5,606,365 A | 2/1997 | Maurinus et al. |
| 5,608,490 A | 3/1997 | Ogawa |
| 5,652,621 A | 7/1997 | Adams, Jr. et al. |
| 5,657,077 A | 8/1997 | DeAngelis et al. |
| 5,682,152 A | 10/1997 | Wang et al. |
| 5,734,831 A | 3/1998 | Sanders |
| 5,737,491 A | 4/1998 | Allen et al. |
| 5,754,227 A | 5/1998 | Fukuoka |
| 5,761,655 A | 6/1998 | Hoffman |
| 5,781,743 A | 7/1998 | Matsuno et al. |
| 5,781,901 A | 7/1998 | Kuzuma |
| 5,790,878 A | 8/1998 | Anderson et al. |
| 5,798,794 A | 8/1998 | Takahashi |
| 5,806,005 A | 9/1998 | Hull et al. |
| 5,818,525 A | 10/1998 | Elabd |
| 5,826,023 A | 10/1998 | Hall et al. |
| 5,835,580 A | 11/1998 | Fraser |
| 5,848,193 A | 12/1998 | Garcia |
| 5,870,383 A | 2/1999 | Eslambolchi et al. |
| 5,880,856 A | 3/1999 | Ferriere |
| 5,892,900 A | 4/1999 | Ginter et al. |
| 5,896,502 A | 4/1999 | Shieh et al. |
| 5,903,723 A | 5/1999 | Beck et al. |
| 5,911,044 A | 6/1999 | Lo et al. |
| 5,913,088 A | 6/1999 | Moghadam et al. |
| 5,915,112 A | 6/1999 | Boutcher |
| 5,917,542 A | 6/1999 | Moghadam et al. |
| 5,928,325 A | 7/1999 | Shaughnessy et al. |
| 6,008,847 A | 12/1999 | Bauchspies |
| 6,009,201 A | 12/1999 | Acharya |
| 6,020,920 A | 2/2000 | Anderson |
| 6,023,585 A | 2/2000 | Perlman et al. |
| 6,028,807 A | 2/2000 | Awsienko |
| 6,031,964 A | 2/2000 | Anderson |
| 6,043,837 A | 3/2000 | Driscoll, Jr. et al. |
| 6,064,437 A | 5/2000 | Phan et al. |
| 6,064,671 A | 5/2000 | Killian |
| 6,067,383 A | 5/2000 | Taniguchi et al. |
| 6,067,571 A | 5/2000 | Igarashi et al. |
| 6,085,249 A | 7/2000 | Wang et al. |
| 6,091,777 A | 7/2000 | Guetz et al. |
| 6,094,689 A | 7/2000 | Embry et al. |
| 6,101,320 A | 8/2000 | Schuetze et al. |
| 6,104,430 A | 8/2000 | Fukuoka |
| 6,125,201 A | 9/2000 | Zador |
| 6,128,413 A | 10/2000 | Benamara |
| 6,154,493 A | 11/2000 | Acharya et al. |
| 6,157,746 A | 12/2000 | Sodagar et al. |
| 6,163,604 A | 12/2000 | Baulier et al. |
| 6,195,026 B1 | 2/2001 | Acharya |
| 6,198,941 B1 | 3/2001 | Aho et al. |
| 6,202,060 B1 | 3/2001 | Tran |
| 6,239,837 B1 | 5/2001 | Yamada et al. |
| 6,243,420 B1 | 6/2001 | Mitchell et al. |
| 6,256,666 B1 | 7/2001 | Singhal |
| 6,269,402 B1 | 7/2001 | Lin et al. |
| 6,269,481 B1 | 7/2001 | Perlman et al. |
| 6,285,471 B1 | 9/2001 | Pornbacher |
| 6,285,775 B1 | 9/2001 | Wu et al. |
| 6,297,870 B1 | 10/2001 | Nanba |
| 6,311,215 B1 | 10/2001 | Bakshi et al. |
| 6,330,068 B1 | 12/2001 | Matsuyama |
| 6,330,613 B1 | 12/2001 | Vlajnic et al. |
| 6,335,783 B1 | 1/2002 | Kruit |
| 6,336,142 B1 | 1/2002 | Kato et al. |
| 6,348,929 B1 | 2/2002 | Acharya et al. |
| 6,360,252 B1 | 3/2002 | Rudy et al. |
| 6,385,177 B1 | 5/2002 | Suda et al. |
| 6,392,697 B1 | 5/2002 | Tanaka et al. |
| 6,392,699 B1 | 5/2002 | Acharya |
| 6,393,470 B1 | 5/2002 | Kanevsky et al. |
| 6,400,903 B1 | 6/2002 | Conoval |
| 6,417,882 B1 | 7/2002 | Mahant-Shetti |
| 6,417,913 B2 | 7/2002 | Tanaka |
| 6,423,892 B1 | 7/2002 | Ramaswamy |
| 6,424,739 B1 | 7/2002 | Ukita et al. |
| 6,445,412 B1 | 9/2002 | Shiohara |
| 6,449,658 B1 | 9/2002 | Lafe et al. |
| 6,457,044 B1 | 9/2002 | IwaZaki |
| 6,459,816 B2 | 10/2002 | Matsuura et al. |
| 6,463,177 B1 | 10/2002 | Li et al. |
| 6,480,853 B1 | 11/2002 | Jain |
| 6,505,236 B1 | 1/2003 | Pollack |
| 6,507,362 B1 | 1/2003 | Akerib |
| 6,507,864 B1 | 1/2003 | Klein et al. |
| 6,509,910 B1 | 1/2003 | Agarwal et al. |
| 6,512,919 B2 | 1/2003 | Ogasawara |
| 6,539,169 B1 | 3/2003 | Tsubaki et al. |
| 6,542,186 B2 | 4/2003 | Uryu |
| 6,542,748 B2 | 4/2003 | Hendrey et al. |
| 6,546,143 B1 | 4/2003 | Taubman |
| 6,549,958 B1 | 4/2003 | Kuba |
| 6,577,338 B1 | 6/2003 | Tanaka et al. |
| 6,583,813 B1 | 6/2003 | Enright et al. |
| 6,598,076 B1 | 7/2003 | Chang et al. |
| 6,600,930 B1 | 7/2003 | Sakurai et al. |
| 6,606,669 B1 | 8/2003 | Nakagiri |
| 6,615,224 B1 | 9/2003 | Davis |
| 6,628,325 B1 | 9/2003 | Steinberg et al. |
| 6,630,954 B1 | 10/2003 | Okada |
| 6,657,702 B1 | 12/2003 | Chui et al. |
| 6,704,712 B1 | 3/2004 | Bleiweiss |
| 6,721,796 B1 | 4/2004 | Wong |
| 6,725,300 B1 | 4/2004 | Nagasaka et al. |
| 6,734,994 B2 | 5/2004 | Omori |
| 6,742,043 B1 | 5/2004 | Moussa et al. |
| 6,825,876 B1 | 11/2004 | Easwar et al. |
| 6,910,068 B2 | 6/2005 | Zintel et al. |
| 6,930,709 B1 | 8/2005 | Creamer et al. |
| 6,934,698 B2 | 8/2005 | Judd et al. |
| 7,020,881 B2 | 3/2006 | Takahashi et al. |
| 7,034,871 B2 | 4/2006 | Parulski et al. |
| 7,103,357 B2 | 9/2006 | Kirani et al. |
| 7,158,945 B1 * | 1/2007 | Wolcott et al. ............... 705/26.8 |
| 7,265,779 B2 | 9/2007 | Sato et al. |
| 7,343,320 B1 * | 3/2008 | Treyz et al. .................. 705/26.5 |
| 7,372,485 B1 | 5/2008 | Bodnar et al. |
| 7,433,710 B2 | 10/2008 | Bodnar et al. |
| 7,610,331 B1 | 10/2009 | Genske et al. |
| 7,610,349 B1 | 10/2009 | Swinton et al. |
| 7,724,281 B2 | 5/2010 | Vale et al. |
| 2001/0002845 A1 | 6/2001 | Tamashima |
| 2001/0007107 A1 | 7/2001 | Yamaguchi |
| 2001/0017668 A1 | 8/2001 | Wilcock et al. |
| 2001/0019359 A1 | 9/2001 | Parulski et al. |
| 2001/0023461 A1 | 9/2001 | Hara et al. |
| 2001/0030692 A1 | 10/2001 | Yoneda |
| 2001/0049648 A1 | 12/2001 | Naylor et al. |
| 2001/0049693 A1 | 12/2001 | Pratt |
| 2001/0054075 A1 | 12/2001 | Miyanaga |
| 2002/0001042 A1 | 1/2002 | Terakado et al. |
| 2002/0002624 A1 | 1/2002 | Hausmann et al. |
| 2002/0032027 A1 | 3/2002 | Kirani et al. |
| 2002/0051065 A1 | 5/2002 | Takahashi |
| 2002/0054212 A1 | 5/2002 | Fukuoka |
| 2002/0082001 A1 | 6/2002 | Tanaka et al. |
| 2002/0083004 A1 | 6/2002 | Saneto et al. |
| 2002/0108118 A1 | 8/2002 | Cohen et al. |
| 2002/0120693 A1 | 8/2002 | Rudd et al. |
| 2002/0151283 A1 | 10/2002 | Pallakoff |
| 2002/0164977 A1 | 11/2002 | Link, II et al. |
| 2002/0169823 A1 | 11/2002 | Coulombe et al. |
| 2002/0171737 A1 | 11/2002 | Tullis |
| 2002/0194414 A1 | 12/2002 | Bateman et al. |
| 2003/0093565 A1 | 5/2003 | Berger et al. |
| 2003/0115277 A1 | 6/2003 | Watanabe et al. |
| 2003/0133015 A1 | 7/2003 | Jackel et al. |
| 2003/0135681 A1 | 7/2003 | Laity et al. |
| 2003/0142215 A1 | 7/2003 | Ward et al. |
| 2004/0078304 A1 | 4/2004 | Gabbard et al. |
| 2004/0109063 A1 | 6/2004 | Kusaka et al. |
| 2004/0171371 A1 | 9/2004 | Paul |
| 2006/0173781 A1 | 8/2006 | Donner |

FOREIGN PATENT DOCUMENTS

| | | |
|---|---|---|
| EP | 0835013 A2 | 4/1998 |
| EP | 0949805 A2 | 10/1999 |

| | | |
|---|---|---|
| EP | 0950969 A2 | 10/1999 |
| GB | 2289555 A | 11/1995 |
| GB | 2365177 A | 2/2002 |
| WO | WO 99/06910 A1 | 2/1999 |
| WO | WO 99/13429 A1 | 3/1999 |
| WO | WO 99/60793 A1 | 11/1999 |
| WO | WO 00/72534 A1 | 11/2000 |
| WO | WO 00/75859 A1 | 12/2000 |
| WO | WO 01/01663 A1 | 1/2001 |
| WO | WO 01/33470 A1 | 5/2001 |
| WO | WO 02/13031 A1 | 2/2002 |

OTHER PUBLICATIONS

How you'll obtain new songs from now on: What does Internet access to the world's music libraries mean for the $40-billion-a-year music industry? In a word: revolution; [National Edition], Neil McCormick. National Post. Don Mills, Ont.: Jan. 3, 2000. p. D.9, downloaded from ProQuestDirect on the Internet on Jul. 12, 2012, 4 pages.*
Motorola, Kahn Unite on Photos, Asian Wall Street Journal, New York, Feb. 8, 2000, 2 pages.
Business Editors, LightSurf Infrastructure to Support Multi/Media Messaging Services. Business Wire, Mar. 19, 2001, 2 pages.
Business Editors, ImageScape 2000 Highlights Digital Imaging Explosion in E-Business, Business Wire, Mar. 1, 2000, 3 pages.
Neil McCormick, "How You'll Obtain Songs From Now on: What Does Internet Access to the World's Music Libraries Mean for The $40-Billion-A-Year Music Industry? in a Word: Revolution" [National Edition], National Post, Don Mills, Ont.: Jan. 3, 2000, p. D.9, 3 pages, downloaded from the ProQuest on the Internet on Mar. 20, 2007.
Araki, Hitoshi et al. "A Non-Stop Updating Technique for Device Driver Programs on the IROS Platform," Jun. 1995, IEEE, vol. 1, pp. 88-92.
Corcoran, Peter M. et al., "Internet Enabled Digital Photography," International Conference on Consumer Electronics, Jun. 22, 1999, pp. 84-85.
Foley, James D., et al., "Computer Graphics: Principles and Practice", 2nd Edition, Chapter 13, pp. 563-604, Addison-Wesley Publishing Company, Reading, MA, 1990.
Gosling, J. et al., The Java Language Environment: A White Paper, Sun Microsystems Computer Company, May 1996, 82 pgs.
Haskell, B. G. et al., "Digital Video: An Introduction to MPEG-2," Chapman and Hall, pp. 80-109, 1997.
Li, Jin, et al., "Coding Artifact Removal with Multiscale Processing," Proceedings,—IEEE International Conference on Image Processing '97, Santa Barbara, CA, Oct. 27-29, 1997.
Lindley, Craig A., "JPEG-Like Image Compression," Part 1, Dr. Dobbs Journal, Jul. 1995.
Lindley, Craig A., "JPEG-Like Image Compression," Part 2, Dr. Dobbs Journal, Aug. 1995.
Mann, Steve, "The Wireless Application Protocol," Dr. Dobb's Journal, Oct. 1999, pp. 56-66.
Nelson, M. et al., "The Data Compression Book," Second Edition, Chapter 11, Lossy Graphics Compression (portion at pp. 326-330), M&T Books, 1996.
Nelson, M. et al., "The Data Compression Book," Second Edition, Chapters 4 & 5, pp. 75-152, M&T Books, 1996.
Padmanabhan, K., et al., A Scheme for Data Collection from Unattended Instruments by a Personal Computer, May 1992, IEEE, pp. 612-615.
Parker, T. et al "TCP/IP Unleashed, Chapter 2: Overview of TCP/IP," Sams Publishing, 1996.
PCT Written Opinion for International Application No. PCT/US01/40216, mailed May 29, 2003, 4 pages.
Pennebaker, William B. et al., "JPEG—Still Image Compression Standard," Chapter 16, pp. 261-266, 1993.
Pigeon, Steven, "Image Compression with Wavelets," Dr. Dobb's Journal, Aug. 1999, pp. 111-115.
Pilling, Michael, et al., "Formal Specifications and Proofs of Inheritance Protocols for Real-Time Scheduling", Software Engineering Journal, Sep. 1990, pp. 263-279.
Rekimoto et al., CyberCode: Desiging Augmented Reality Environments with Visual Tags, Apr. 2000, Proceeding of DARE 2000 on Design Augmented Reality Environments, 9 pgs.
Ricoh Corporation, "Ricoh Announces New 2.3 Megapixel Digital Camera," press release, Feb. 17, 1999, pp. 1-4.
Sha, Lui, et al., "Priority Inheritance Protocols: An Approach to Real-Time Synchronization", IEEE Transactions on Computers, vol. 39, No. 9, Sep. 1990, pp. 1175-1185.
Simpson, W. (Ed.), RFC 1661, The Point-to-Point Protocol (PPP), Jul. 1994.
Socolofsky, T.J., et al., RFC 1180: TCP/IP Tutorial, Jan. 1, 1991, 30 pgs.
Taubman, D. et al "Multirate 3-D Subband Coding of Video," IEEE Transactions on Image Processing, vol. 3, No. 5, Sep. 1994, pp. 572-588.
UPnP Device Architecture, Version 1.0, Jun. 8, 2000, Contributing Members of the UPnp Forum.
W3.ORG, Extensible Markup Language (XML) 1.0 (second edition) specification, Oct. 6, 2000.
Zigon, Robert, "Run Length Encoding," Dr. Dobb's Journal Feb. 1989.

* cited by examiner

MEDIA ASSET MANAGEMENT SYSTEM

This patent application is a divisional patent application of U.S. patent application Ser. No. 09/814,159, filed Mar. 20, 2001, now pending.

RELATED APPLICATIONS

The present application is related to the following commonly-owned application(s): application Ser. No. 09/759,108, filed Jan. 11, 2001, entitled "Media Spooler System and Methodology Providing Efficient Transmission of Media Content from Wireless Devices". The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of media objects or "assets" (e.g., digital images, sound, video, and/or other media objects) and, more particularly, to system and methodology for efficient management of such media assets.

In today's e-commerce environment, fundamental problems exist in terms of how to track what activity users are doing, when they did that activity, and how long they did it for. Thus, for example, in the instance where a user has uploaded a photo (i.e., digital image) from a wireless device and shared that photo with other users, or performed an e-commerce transaction based on that photo, cost considerations are associated with the wireless infrastructure and back-end infrastructure necessary for supporting those activities. Also, in an e-commerce transaction, often a multi-party deal occurs between the carrier or cell phone manufacturer or the back-end provider—that is, the e-commerce "partners." Any transaction associated with wireless- and wireline-connected devices must generate a transaction-based revenue order for that transaction item in order to properly bill the end user, as well as properly allocate the costs associated with a given transaction. Accordingly, the problem arises as to how does one accurately track e-commerce and other online activities in order to allocate the cost and revenues associated with each transaction. This problem—about how to best track information about what users did and when—is particularly difficult when media assets, such as digital photographic images, are involved, as those assets are easily passed among various users online, each user of which may interact with a particular online vendor or "e-commerce partner."

There have been some attempts to address specific areas of this problem, but to date the approaches have only provided piecemeal support; no end-to-end solution has emerged. For instance, wireless operators can capture and track how long a user uses a cell phone device or how long a wireless data call lasted. In more general terms, wireless carriers can track information with respect to a given user session at the core transport layer (i.e., how long the call lasted), but they cannot track at the application layer—that is, track which particular features or areas of functionality were used, particularly in connection with a specific object (e.g., media object) of a particular user. For example, if a user made a wireless data call to send fifteen e-mails connecting to that user's company email service, the wireless carrier or operator is not able to track how many emails were sent over its wireless network. Instead, the carrier is only able to track the transmission session, in other words, just the transmission start and end times. As a result, the carrier is only able to bill the customer based on air time of the data service, thus preventing the carrier from exploring other revenue models, such as employing a pricing scheme based on a number of emails sent, number of bytes transmitted, or the like.

As another example, from the Internet, Web site operators have tracked user interaction in terms of when a particular user logs in and logs out. Additionally, operators may track session-specific information, such as which pages a user visited (or did not visit), based on user demographic information. Commonly, this information can be stored as a small text file ("cookie") at the user's own computer. This type of information provides an understanding of the usage scenario and the behavior of the user, but is not particularly useful for generating a billing document. Additionally, users often block cookie-based tracking information, due to concerns about user privacy. All told, while cookie-based tracking information is useful for gleaning user preferences, it does not provide an effective approach for generating information that is suitable for creating an appropriate billing document based on the user's activities that employ different vendor services for media-based objects or assets.

Increasingly, communication services—both wireless- and wireline-based—are being employed for transmitting a variety of media types. For example, with ever-increasing interest in digital photography, both wireless- and wireline-enabled devices are being employed for uploading photos to Internet-based computers, where the digital photographs may be shared and/or further processed. Other media types commonly transmitted by users include audio (e.g., MP3) and video (e.g., MPEG) media types. With ever-increasing bandwidth becoming available, this trend can only be expected to increase. As a result, there is great interest in creating a solution that allows vendors to provide users with enhanced services for supporting and processing different media types of interest to users, but does so with a viable e-commerce business model. What is needed is an asset management or tracking system providing methodologies that allow vendors to track specific user activities on a per-object, per-vendor basis, including tracking metrics providing information about services used other than just connection time. The present invention fulfills this and other needs.

SUMMARY OF THE INVENTION

The present invention provides an asset management system that tracks in real-time any metric that a carrier requires pertaining to media assets within a network. In addition to tracking per-asset information relating to usage and air time, the system tracks information pertaining to individual object types (e.g., document, digital image, audio file, streaming media, or the like) as well as specific objects themselves (e.g., individual documents, photos, and the like, on a per-file or named basis). This information can be tracked against the various users and their individual devices (used to access a network). In this manner, the system can provide metrics relating to not only data size and air time, but also metrics about object types (e.g., digital image type) and specific objects (e.g., specific file transferred) that have passed through the network. Based on these various metrics that the asset management system can track, the system generates reports that are transmitted back in real-time to carriers for implementing the various pricing schemes required for supporting their business or revenue models.

The asset management system includes a media gateway, media vault, media exchange, and asset tracking module. The media gateway predominately plays the role of capturing wireless and wireline uploads that are arriving from various devices. The media exchange is responsible for sending content to target devices, performing any required on-the-fly translation of stored media from one photo format into another, as required for rendering at a given target device. The media vault serves to maintain and organize media content itself for long-term storage in a secure fashion based on a per-user basis, using a key index based on a given user's user ID. Each component allows multiple invocations of itself, thereby allowing for instance multiple instances of media exchange and multiple instances of media gateways to run concurrently. Of particular interest is the asset tracking module, which embodies methodologies of the present invention for asset management and tracking. The module interfaces to external interfaces, such as a partner interface and a billing interface. The asset tracking module, which integrates with the other components, provides an end-to-end solution for tracking online user activity.

In this design, highly integrated, yet decoupled components operate to collect a lot of information about user interactions. The system provides a centralized database that can proactively capture usage and billing information from different servers, regardless of where particular components are running. For instance, some components of the system could be running in the same hosting center at the carrier, and the rest of the components could be running at a different hosting center, for instance, one that is remote from the carrier. The particular strength of this design is that regardless of where individual components are running, information is collected into one central place so that it can be processed and analyzed, including correcting erroneous data, so as to create a centralized unified data store that may be used for supporting the end users for marketing purposes as well as for billing and revenue-sharing purposes.

With this system design, two approaches are adopted for system operation. First, system operation is transparent to end user's activities. In particular, whenever one wants to track this information and collect it, the end user's regular activity should not be effected; instead, the end user should continue to do what he/she is doing and the tracking and collecting happens behind the scene with no impact on the performance of the end user's expected behavior. Second, if the tracking system goes down, the regular solution, such as end user photo uploading and photo sharing, should still continue to operate. To achieve this transparency, the tracking system operates in batch mode to collect information. In this manner, the tracking system provides a totally independent system that is decoupled from the regular services being provided to end users. In the event that the tracking system goes down, it can always be restarted without impact to other system services.

GLOSSARY

Figure 1A:
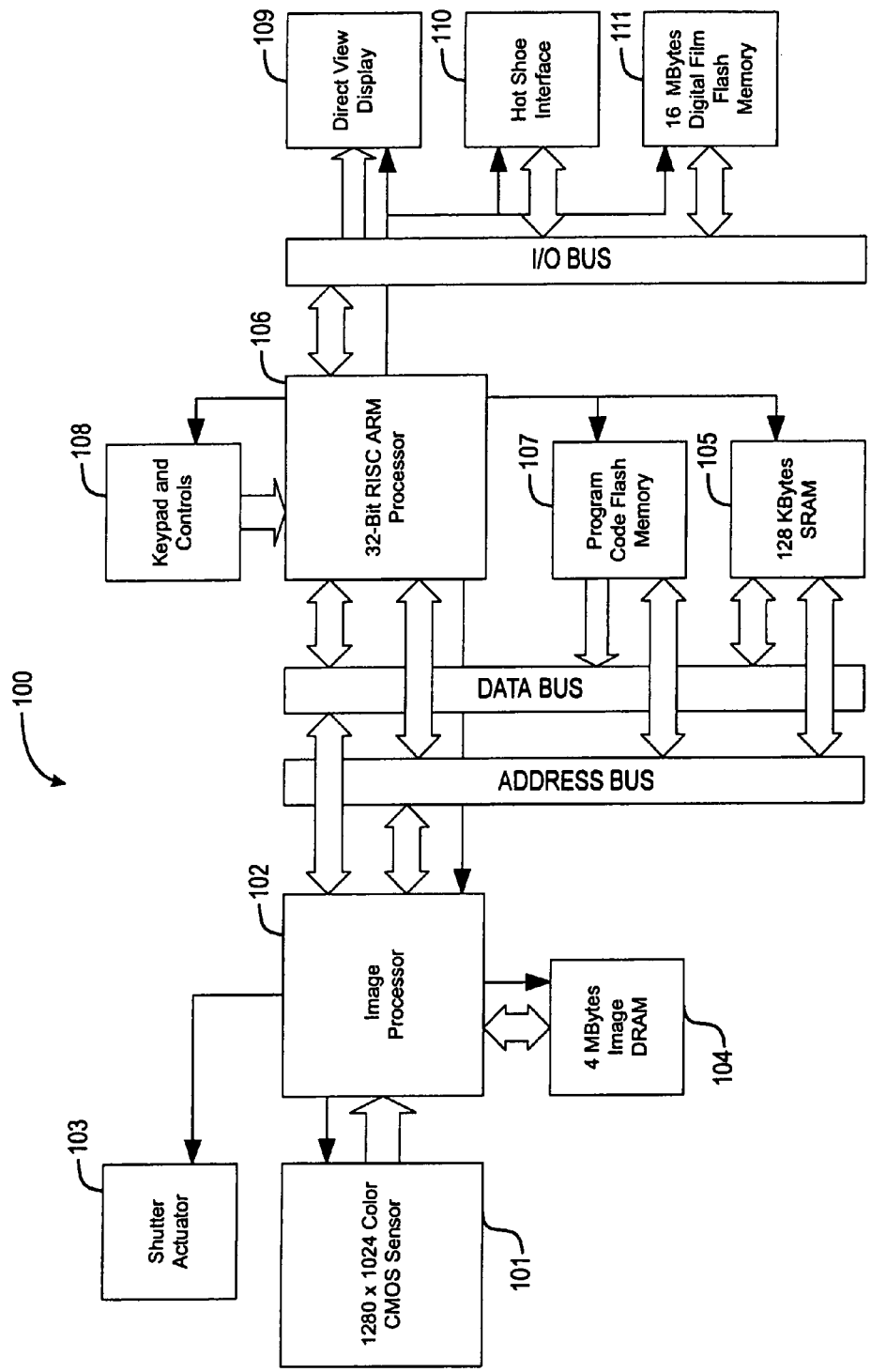
FIG. 1A is a block diagram illustrating a basic image capturing and recording system suitable for implementing a portion of the present invention pertaining to initial capture of digital media.

Apache Web server: A public-domain Web server developed by a loosely-knit group of programmers. The first version of Apache, based on the NCSA httpd Web server, was developed in 1995. Because it was developed from existing NCSA code plus various patches, it was called "a patchy" server—hence the name Apache Server.

HTTP: Short for HyperText Transfer Protocol, the underlying protocol used by the World Wide Web. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3C), and is currently available via the Internet at http://www.w3.org/Protocols/.

Media: Used herein to refer broadly to objects, content, technology, or the like used to communicate information, such as text, graphics, sound, pictures, and videos, all of which are different types of media.

TCP/IP: Stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see, e.g., RFC 1180: A TCP/IP Tutorial, the disclosure of which is hereby incorporated by reference. A copy of RFC 1180 is currently available at ftp://ftp.isi.edu/in-notes/rfc1180.txt.

URL: Abbreviation of Uniform Resource Locator, the global address of documents and other resources on the World Wide Web. The first part of the address indicates what protocol to use, and the second part specifies the IP address or the domain name where the resource is located.

WAP: Stands for Wireless Application Protocol. WAP is a communication protocol, not unlike TCP/IP, that was developed by a consortium of wireless companies, including Motorola, Ericsson, and Nokia, for transmitting data over wireless networks. For a description of WAP, see e.g., Mann, S., The Wireless Application Protocol, Dr. Dobb's Journal, pp. 56-66, October 1999, the disclosure of which is hereby incorporated by reference.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (www.w3.org), the disclosure of which is hereby incorporated by reference. The specification is also currently available on the Internet at http://www.w3.org/TR/REC-xml.

DETAILED DESCRIPTION OF A PREFERRED EMBODIMENT

The following description focuses on an embodiment of the present invention employing a server-based asset management tracking system that tracks various media assets or objects that typically have been sent from media capturing devices, such as a digital camera using wireless communication. As a result, portions of the preferred embodiment pertain to implementation details optimized for tracking digital image-based media assets. However, those skilled in the art will appreciate that the present invention may be embodied using a variety of other media generating/capturing/recording/processing devices, including, for instance, digital audio recorders, video phones, closed-circuit cameras, video camcorders, document-generating devices, or other devices capable of creating, capturing, recording, and/or processing digital images, audio, video, and/or print media. Further, the description will focus on implementation of portions of the invention in an Internet-connected environment including desktop and server computers, such as an IBM-compatible computer running under Microsoft® Windows 2000. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Basic System

A. Basic Digital Camera Hardware

FIG. 1A is a block diagram illustrating a basic image capturing and recording system 100 suitable for implementing a portion of the present invention pertaining to initial capture of digital media, which then may be transmitted to a host system (e.g., computer system) using wireless technique. The system 100 also supports transmission using wireline technique. For purposes of illustration, the following will focus on implementation of the system 100 as a digital camera. However, as noted above, for purposes of implementing the methodology of the present invention, the system 100 may also be implemented in a variety of other digital image devices, or, if desired, other digital media devices (e.g., digital audio recorder or digital video recorder).

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus. The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280×1024 color CMOS sensor, such as a VLSI Vision VVL 6801 CMOS sensor. However, other sensor technology is suitable, including CCD sensors.

Further description of the system 100 may be found in above-mentioned application Ser. No. 09/759,108, which has previously been incorporated by reference. Although the preferred embodiment described herein may employ the system 100 for providing media assets, the asset management system of the present invention in fact works with a variety of different media assets, regardless of which particular capture device was initially used to create a given media asset. Instead, all that is required of the capturing device is that one can eventually retrieve media assets from that device for transmission to a network (e.g., the Internet) that is in communication with the asset management system of the present invention. Preferably, such transmission occurs, at least in part, over a wireless network, thereby providing maximum convenience for the user.

B. Basic Computer Hardware (e.g., for Desktop and Server Computers)

Figure 1B:
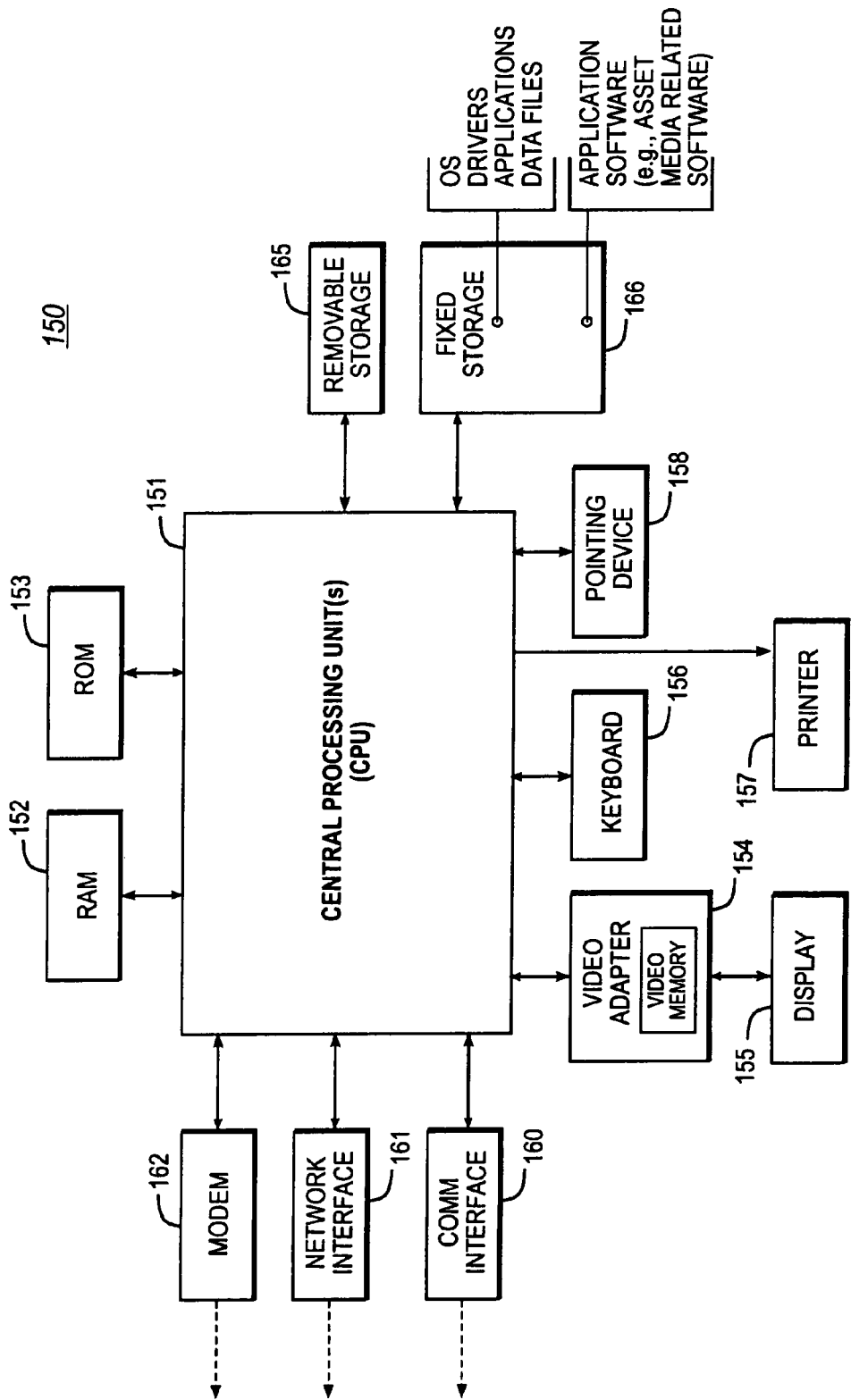
FIG. 1B is a general block diagram of a general-purpose computer system suitable for implementing the present invention.

Portions of the present invention may be implemented on a conventional or general-purpose computer system, such as an IBM-compatible personal computer (PC) or server computer. FIG. 1B is a very general block diagram of an IBM-compatible system 150, which is adapted to include portions of the distributed image processing of the present invention. As shown, system 150 comprises a central processor unit(s) (CPU) 151 coupled to a random-access memory (RAM) 152, a read-only memory (ROM) 153, a keyboard 156, a pointing device 158, a display or video adapter 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel Pentium® family of microprocessors. However, any other suitable microprocessor or microcomputer may be utilized for implementing the present invention. The CPU 151 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input/output (I/O) system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1B, fixed storage 166 stores a body of program and data for directing operation of the computer system 150, including an operating system, user application programs, driver and other support files, as well as other data files of all sorts. Typically, the fixed storage 166 serves as the main hard disk for the system and stores application software, for instance, software implementing the computer-implemented methodologies described below.

In basic operation, program logic (including that which implements methodology of the present invention described below) is loaded from the storage device or mass (fixed) storage 166 into the main (RAM) memory 152, for execution by the CPU 151. During operation of the program logic, the system 150 accepts user input from a keyboard 156 and a pointing device 158, as well as speech-based input from a voice recognition system (not shown). The keyboard 156 permits selection of application programs, entry of keyboard-based input or data, and selection and manipulation of individual data objects displayed on the display device 155. Likewise, the pointing device 158, such as a mouse, track ball, pen device, or the like, permits selection and manipulation of objects on the display device 155. In this manner, these input devices support manual user input for any process running on the system.

The computer system displays text and/or graphic images and other data on the display device 155. Display device 155 is driven by the video adapter 154, which is interposed between the display device 155 and the system 150. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. The printer 157 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or a modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include an RS-232 serial port, a Universal Serial Bus (USB) interface, or the like. Devices that will be commonly-connected locally to the comm interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

C. Basic System Software

Figure 2:
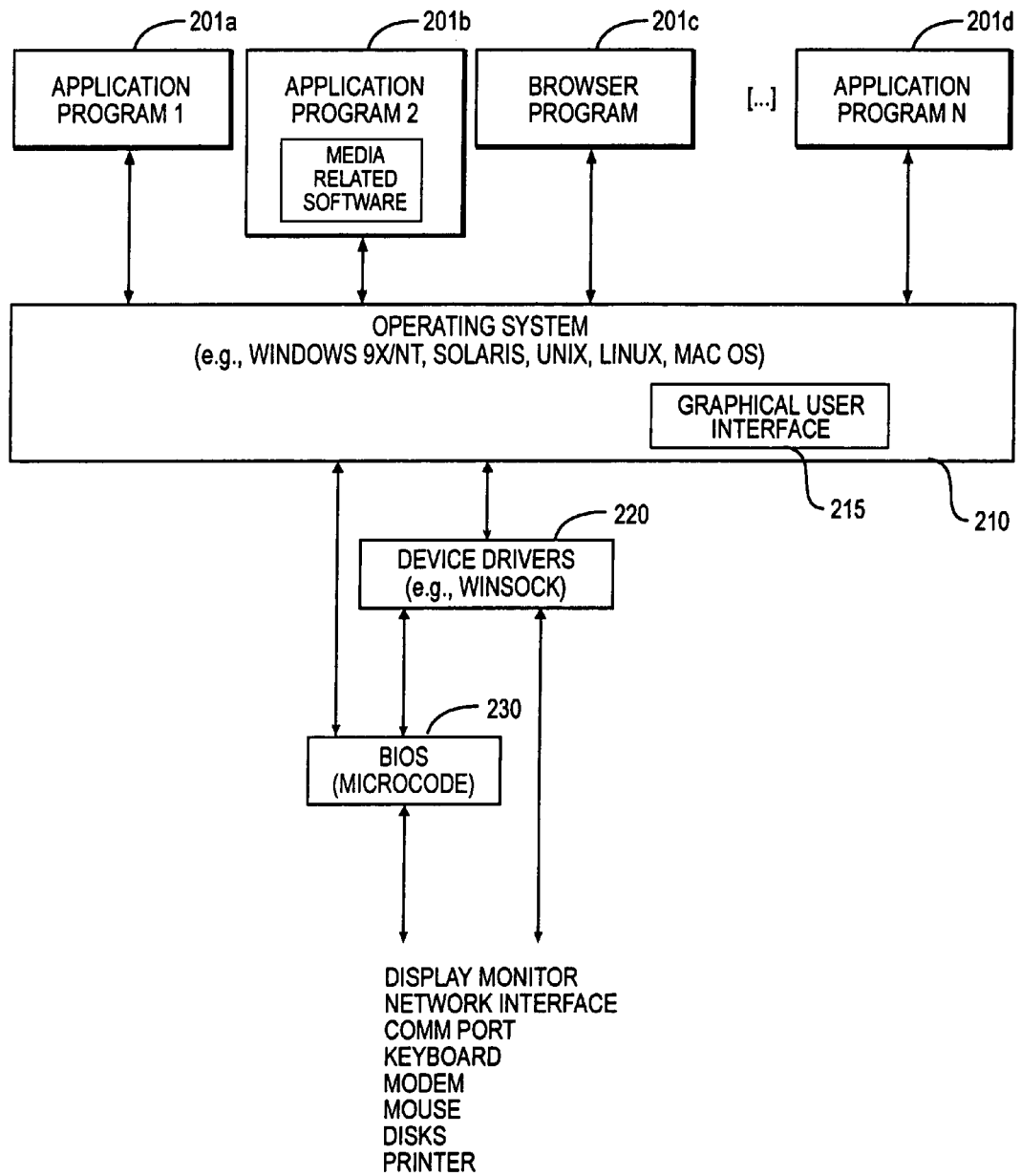
FIG. 2 is a block diagram of a computer software system suitable for controlling the computer of FIG. 1B.

Illustrated in FIG. 2, a computer software system 200 is provided for directing the operation of the computer system 150. Software system 200, which is stored in system memory (RAM) 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*), including image processing software, may be "loaded" (i.e., transferred from fixed storage 166 into memory 152) for execution by the system 150.

Software system 200 includes a graphical user interface (GUI) 215, for receiving user commands and data in a graphical (e.g., "point-and-click") fashion. These inputs, in turn, may be acted upon by the system 150 in accordance with instructions from operating system 210 and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' TCP/IP implementation) and the system BIOS microcode 230 (i.e., ROM-based microcode), particularly when interfacing with peripheral devices. OS 210 can be provided by a conventional operating system, such as Microsoft® Windows 9x, Microsoft® Windows ME, Microsoft® Windows NT, or Microsoft® Windows 2000, all available from Microsoft Corporation of Redmond, Wash. Alternatively, OS 210 can also be an alternative operating system, such as IBM OS/2 (available from IBM of Armonk, N.Y.) or Macintosh OS (available from Apple Computer of Cupertino, Calif.).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) which communicates with one or more "clients" (e.g., media-capturing devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Asset Management System and Associated Computer-Implemented Methodologies

A. Introduction

In today's e-commerce environments, businesses need the flexibility to fashion revenue models supporting different pricing schemes. This is particularly true for the wireless carriers who provide wireless networks for transmitting voice and data, including digital media—audio, video, digital images, digital documents, and the like. For instance, a wireless carrier may wish to implement a payment plan that is a usage-based plan, a subscription-based plan (e.g., monthly basis subscription plan), or a prepaid-based plan. In a usage-based plan, a carrier may charge a customer based on the amount of data transferred (e.g., per-kilobyte or per-megabyte rate) and/or connection time (e.g., air time). In a subscription-based plan, a carrier may charge a customer a fixed amount for a given recurring time period, such as a monthly subscription. Typically, a subscription-based plan would include a cap on usage for the given time period (e.g., upload a maximum of 50 photos per month), after which a surcharge would be imposed. In a prepaid-based plan, a carrier allows a preset amount of service utilization based on how much a customer has already paid the carrier. Typically, a prepaid-based plan is used for those customers who have poor credit or no credit. Of course, various hybrid combinations may be fashioned from the above basic revenue/payment models.

Given the various pricing schemes for supporting different vendor revenue models, there is a need for a system that allows one to track various metrics that characterize the "media assets" being transmitted and processed across a given network, including the Internet. This need is heighten by the fact that a given network, particularly a wireless network, may actually have a multitude of different vendors or partners at different points along that network. Such a system should support the various activities of a vendor, including marketing, billing, and general management of digital media, as a particular media asset crosses different portions of a given network invoking various services of different vendors.

Accordingly, the present invention provides an asset management system that tracks in real-time any metric that a carrier requires pertaining to media assets within a network. In addition to tracking per-asset information relating to usage and air time, the system tracks information pertaining to individual object types (e.g., document, digital image, audio file, streaming media, or the like) as well as specific objects themselves (e.g., individual documents, photos, and the like, on a per-file or named basis). This information can be tracked against the various users and their individual devices (used to access a network). In this manner, the system can provide metrics relating to not only data size and air time, but also metrics about object types (e.g., digital image type) and specific objects (e.g., specific file transferred) that have passed through the network. Based on these various metrics that the asset management system can track, the system generates reports that are transmitted back in real-time to carriers for implementing the various pricing schemes required for supporting their business or revenue models.

By tracking the flow of an individual object (e.g., digital photo) through the network, the asset management system facilitates e-commerce transactions. For example, a digital photo may be shared online among several users on a given network (e.g., wireless network, Internet, or the like). One of those users, in turn, may wish to engage in a particular e-commerce transaction with one of the vendors (e-commerce "partners") on the network. By tracking on a per-object basis, as well as tracking transactions on a per-partner or vendor basis, the system facilitates implementation of revenue-sharing schemes among various e-commerce partners.

Consider the following example. Suppose a carrier, Carrier X, has entered into a revenue-sharing scheme with a vendor, Vendor Y. An e-commerce transaction occurs in which a user, User A, uploads a photo to the carrier's network for sharing with another user, User B, who in turn orders a print, T-shirt, or mug based on a photo from Vendor Y. By employing the asset management system of the present invention, the participation of the object (i.e., the photo uploaded to Carrier X) in a subsequent e-commerce transaction (i.e., at Vendor Y) can be tracked and reported, thereby supporting a revenue-sharing scheme between Carrier X and Vendor Y, for instance, allowing Carrier X to realize a portion of the revenue that results from User B's subsequent e-commerce transactions.

Consider a more concrete example. Using the above approach, Sprint PCS (wireless carrier) may partner with Kodak (e-commerce partner) for offering Kodak photo processing on Sprint's WAP-enabled cell phones. Further, Sprint may participate in revenue sharing with Kodak based on individual photos that are uploaded to Sprint's network and then transmitted to Kodak for processing. In an e-commerce transaction of a Sprint user uploading a digital image to Kodak for creating a 5 by 7 print, the asset management system allows Sprint to identify the uploaded photo as having been transmitted to Kodak (e-commerce partner) for a specific service (creating 5 by 7 print) and thus realize a revenue event based on that identification (e.g., 10 cents for each photo uploaded to Sprint that is processed by the e-commerce partner, Kodak). In this manner, the asset management system of the present invention provides end-to-end tracking of objects flowing through a network, including tracking each object's interaction with the various vendors or partners that may offer products or services on that network.

B. System Overview

Figure 3:
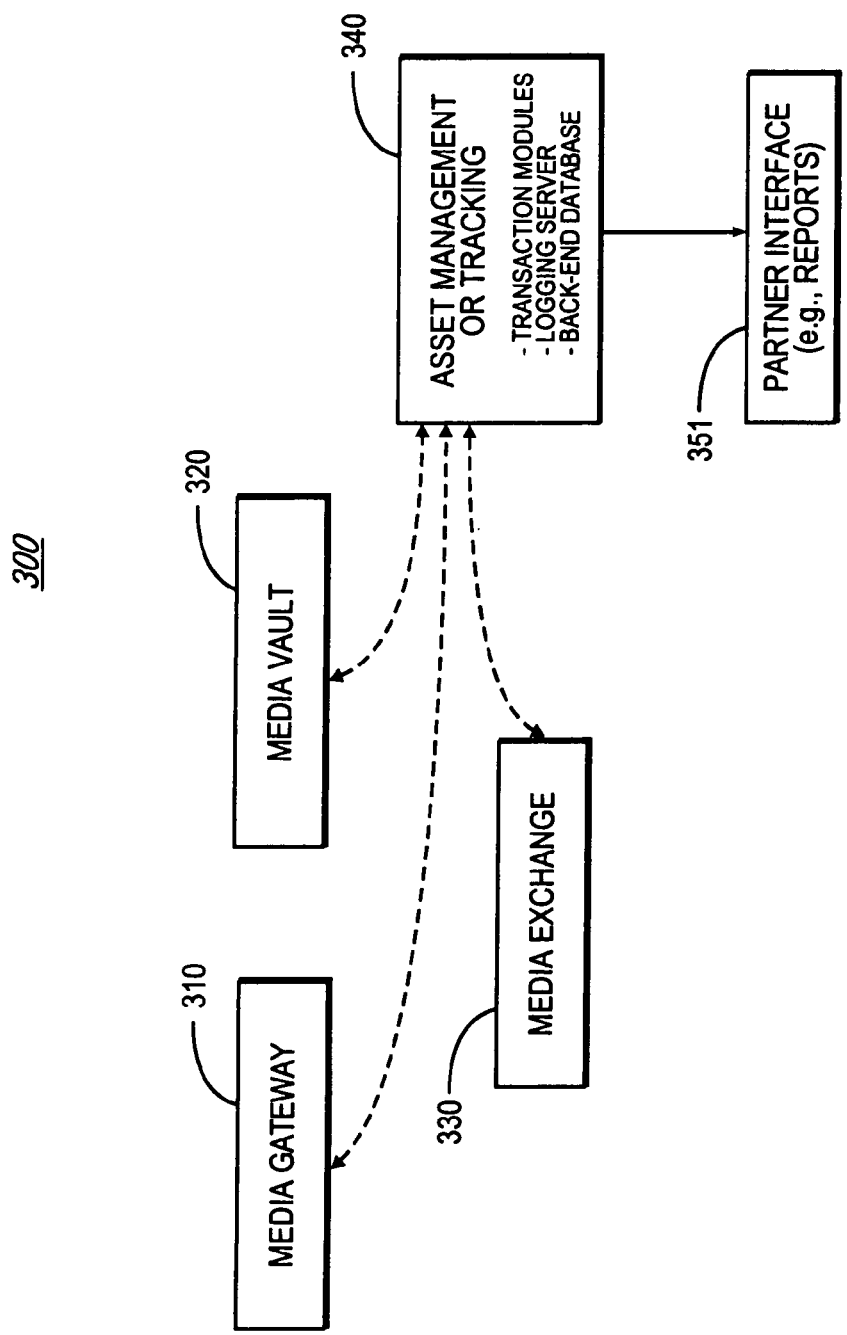
FIG. 3 is a high-level functional view of a media tracking system constructed in accordance with the present invention.

FIG. 3 is a high-level functional view of a media tracking system 300 constructed in accordance with the present invention. As shown, the tracking system 300 includes the following components: a media gateway 310, media vault 320, media exchange 330, and asset management or tracking module 340. The media gateway 310 predominately plays the role of capturing wireless and wireline uploads that are arriving from various devices. The media exchange 330 is responsible for sending content to target devices, performing any required on-the-fly translation of stored media from one photo format into another, as required for rendering at a given target device. The media vault 320 serves to maintain and organize media content itself for long-term storage in a secure fashion based on a per-user basis, using a key index based on a given user's user ID. Each component allows multiple invocations of itself, thereby allowing, for instance, multiple instances of media exchange and multiple instances of media gateways to run concurrently. Of particular interest is the asset management or tracking module 340, which forms the basic engine (core) of the asset management system of the present invention. The asset management or tracking module 340 includes various transaction modules, a logging server, and a back-end database, which are described in greater detail below (see, e.g., FIG. 5 and accompanying description). The asset management or tracking module 340 interfaces to external interfaces, such as a partner interface 351 for obtaining billing and usage reports. With these features, the asset management system of the present invention may provide an end-to-end solution for tracking per-user, per-object, per-vendor online activity, for supporting a variety of business models.

In this design, highly integrated, yet decoupled components operate to collect a lot of information about user interactions. The system provides a centralized database that can proactively capture usage and billing information from different servers, regardless of where particular components are running. For instance, some components of the system could be running in the same hosting center at the carrier, and the rest of the components could be running at a different hosting center, for instance one remote from the carrier. The particular strength of this design is that regardless of where individual components are running, information is collected into one central place so that it can be processed and analyzed, including correcting erroneous data, so as to create a centralized unified data store that may be used for supporting the end users for marketing purposes as well as for billing and revenue-sharing purposes.

With this system design, two approaches are adopted for system operation. First, system operation is transparent to end user's activities. In particular, whenever one wants to track this information and collect it, the end user's regular activity should not be effected; instead, the end user should continue to do what he/she is doing, and the tracking and collecting happens behind the scene with no impact on the performance of the end user's expected behavior. Second, if the tracking system goes down, the regular solution, such as end user photo uploading and photo sharing, should still continue to operate. To achieve this transparency, the tracking system operates in batch mode to collect information. In this manner, the tracking system 300 provides a totally independent system that is decoupled from the regular services being provided to end users. In the event that the tracking system goes down, it can always be restarted without impact to other system services.

If desired, actual processing of the tracking system may be adjusted throughout a given day, to favor processing during off-peak hours. User activity can be expected to vary based on the time of the day. Accordingly, the system may be configured so that most of the data collection and processing occurs during off-peak hours. In addition to benefiting system performance and scalability, the approach also allows the system to be designed without incurring the cost of providing a high-end transaction database to provide online real-time transaction support. Instead, tracking system operation can be deferred so as to match available bandwidth and resources.

Further description of the media gateway or spooler 310, media vault 320, and media exchange 330 can be found in the previously-mentioned application Ser. No. 09/759,108. Although these components are used in conjunction with the currently-preferred embodiment, they are not specifically required for implementation of the asset tracking and management methodologies of the present invention.

C. Basic System Operation

System operation is perhaps best explained by way of example. Consider a usage scenario where a user is uploading digital photographs, say ten photographs, from his or her wireless camera/phone combination to a photo web site. The first component invoked is the media gateway, which interacts with the camera and phone to receive the ten photos. The media gateway itself tracks information about the user session, including user information, what time of day the photos were uploaded, and how many photos were uploaded. After receiving the photos, media gateway in turn transfers the photos to the media vault. Now suppose that the user desires to "share" the photos online with one or more recipients. The term "share" means making the uploaded photos publicly available on the Internet to one or more specific individuals. At this point, the media exchange, which is responsible for providing content, comes into play by generating a URL link (hyperlink) which it embeds within an email sent to the e-mail addresses for the user's specified recipients. The embedded hyperlink includes an encoded key that includes identifying information and a password, allowing a particular recipient to gain online access to the shared photos by simply "clicking" on the embedded hyperlink. Upon a recipient's invocation of the hyperlink, a browser request is generated which is submitted to the media exchange. In response to this request, the media exchange retrieves the requested photo(s) from the media vault and sends the photo(s), in an appropriate format (e.g., JPEG file, HTML page, WML page, or the like), back to the recipient's target device, including a wireless device with e-commerce capability. At the target device the recipient may initiate an e-commerce transaction, for instance, ordering an enlarged print of the photo, ordering a photo coffee mug, or ordering a photo t-shirt. Whatever type of e-commerce transaction is initiated by the recipient, the transaction is processed through the media exchange.

In this usage scenario, the asset tracking module operates to collect user transaction information from relevant system components. More particularly, each of these components—media gateway, media vault, and media exchange—tracks user interaction that is pertinent to a given object's (e.g., digital photo) interaction with that particular component. This object-based, component-specific information may, in turn, be reported to the asset tracking module. Collectively, the component-specific transaction information of the various components present persistent information that the asset tracking module can store and process.

The asset management or tracking system, at a high level, operates to receive transaction information from the components, including multiple instances which may be executing for a given component, and aggregate that information at the asset management system. By collecting this information into the asset management system's centralized database, the asset tracking module can create a central store of user transaction information. Apart from collection of information by the tracking module, the asset management system serves to distribute information. Here, information is distributed to e-commerce partners for reporting and billing purposes. For instance, a partner may want to know the total number of e-commerce transactions occurring for a given user, a given carrier, and/or a given geographic locale. To support this distribution of information, the asset management system supports reporting capability through the partner interface 351, to allow partners to submit requests for creating reports that are run against the system's database. In response to these partner requests, the asset management system gathers, organizes, and reports partner-relevant information in a convenient XML report format (e.g., illustrated in Appendix A), or a standard CDR (compact data record) format that the partner's billing system recognizes.

D. Types of Information Tracked

Figure 4A:
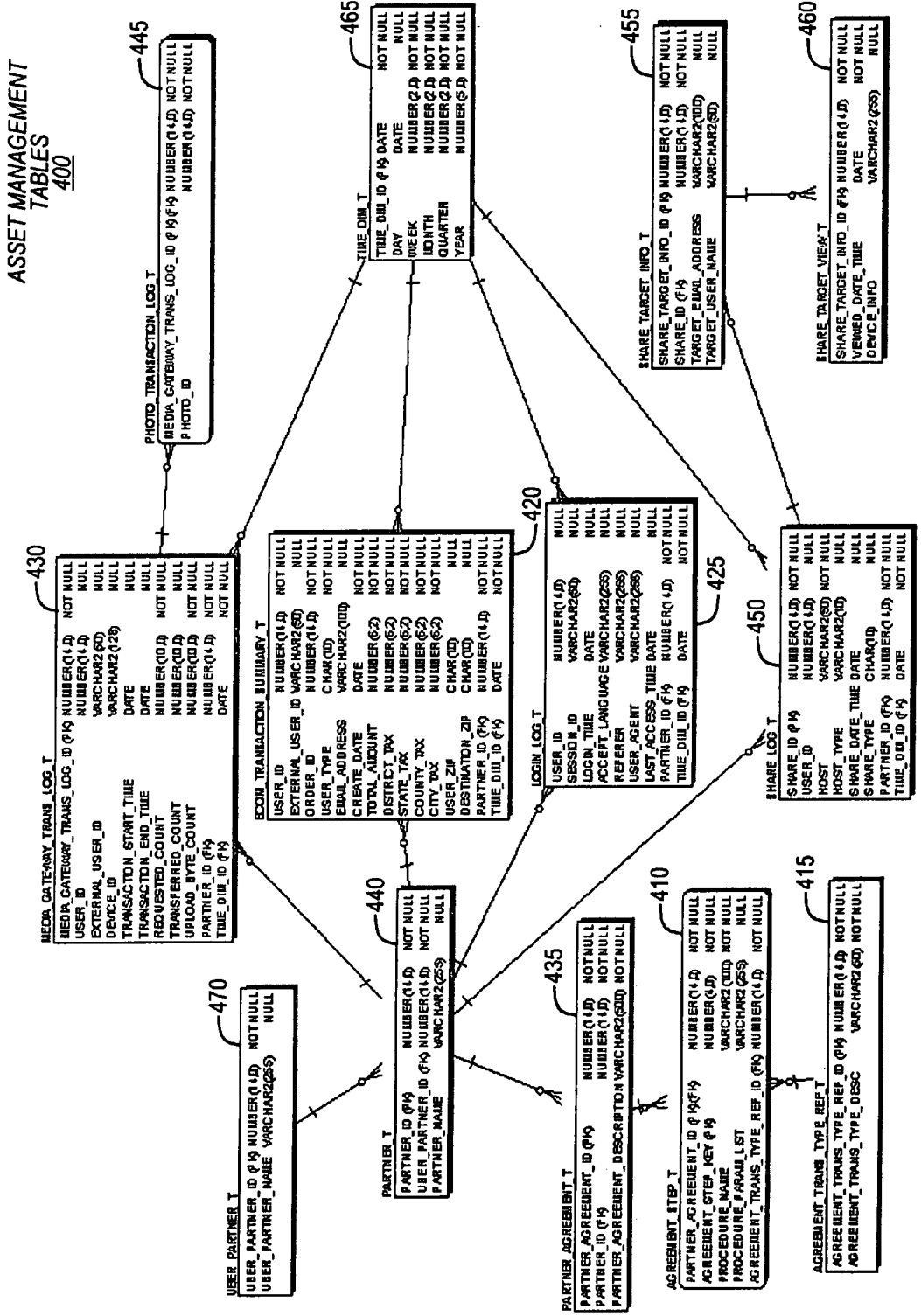
FIGS. 4A-B are diagrams illustrating the types of information tracked in the currently-preferred embodiment.

FIG. 4A illustrates the particular types of information tracked in the currently-preferred embodiment. The figure shows an asset management database schema 400 that presents the types of information that are captured from different places in the system, for storage and processing by the asset management system. These types include media gateway information, sharing information, login information, e-commerce transaction information, and media information. The individual tables comprising the schema will now be described in further detail.

MEDIA_GATEWAY_TRANS_LOG_T table 430 stores information related to the uploading of media assets, such as photos. Thus, it is based on user activity that occurs daily. In general, every time a user connects from a camera device and uploads photos, the system captures the user ID, the start and end time of the session (i.e., how long the user was connected), number of photos and photo parts uploaded, number of bytes uploaded, and the ID of the camera device.

When a user uploads photos for the very first time (i.e., before registering the user), the user will not have a valid user ID but will have a valid device ID (as the device ID is preset at the factory). The device ID employs a LightSurf GUID, which is described in the previously-mentioned application Ser. No. 09/759,108. In that instance, the user is assigned a default "non-user" ID, which serves as a temporary placeholder. Upon the user completing registration, the non-user ID is replaced with the valid user ID which has at that point been assigned to the user. Periodic updates to the database will update the table and resolve the USER_ID, in the event that it is not captured at transaction time. The table will be used to generate disk/bandwidth-based billing information on a periodic basis.

In an exemplary embodiment, the table may be created using the following SQL statement:

```
CREATE TABLE MEDIA_GATEWAY_TRANS_LOG_T(
        MEDIA_GATEWAY_TRANS_LOG_ID  NUMBER(14, 0)    NOT NULL,
        USER_ID                     NUMBER(14, 0),   NULL
        EXTERNAL_USER_ID            VARCHAR2(50),    NULL
        DEVICE_ID                   VARCHAR2(128),   NULL
        TRANSACTION_START_TIME      DATE,            NULL
        TRANSACTION_END_TIME        DATE,            NULL
        REQUESTED_COUNT             NUMBER(10, 0)    DEFAULT 0 NOT NULL,
        TRANSFERRED_COUNT           NUMBER(10, 0),   NULL
        UPLOAD_BYTE_COUNT           NUMBER(10, 0)    DEFAULT 0 NOT NULL,
        PARTNER_ID                  NUMBER(14, 0)    NOT NULL,
        TIME_DIM_ID                 DATE             NOT NULL,
CONSTRAINT PKMEDIA_GATEWAY_TRANS_LOG_T PRIMARY KEY
(MEDIA_GATEWAY_TRANS_LOG_ID)
)
```

As shown, the table includes a MEDIA_GATEWAY_TRANS_LOG_ID field that is a unique ID that is made for each transaction. This field is specified as the primary key for the table. The field is defined to be a number (integer) of 14 significant digits and is constrained to be not null. The next field is USER_ID field which gets generated, and is auto-incremented, at the commencement of a media gateway transaction which occurs when a photo is uploaded to the site. The field is defined to be a number (integer) of 14 significant digits and may be left null. The next field is EXTERNAL_USER_ID field which is used to identify the partner's user. The field is defined to be a variable-length character (VARCHAR2) field of 50 characters maximum and can be left null. The next field is DEVICE_ID field and is a very long GUID, or a unique identifier that is associated with each device. For example it can be a camera which has its own internal device ID (CAMERA_ID) so that the device ID will be sent along with a media gateway transaction, thus giving a unique identification of its origin. The field is defined to be a variable-length character (VARCHAR2) field of 128 characters maximum and may be left null.

The next field is TRANSACTION_START_TIME field that is used for storing data about when the upload started; it may be left null. The TRANSACTION_END_TIME field is used for storing data about when the upload ended and may be left null. Next, the REQUESTED_COUNT field represents the number of assets one wishes to upload—that is, the number of "files" or "images" requested to be transferred. The field is defined to be a number (integer) of 10 significant digits and is specified to be default 0 not null. The TRANSFERRED_COUNT field represents the actual number of assets transferred. The field is defined to be a number (integer) of 10 significant digits and may be left null. This is followed by the UPLOAD_BYTE_COUNT field which represents the number of bytes transferred for a particular asset. The field is defined to be a number (integer) of 10 significant digits and is specified to be default 0 not null. The next field, the PARTNER_ID field, represents a unique partner for the purposes of billing or crediting arrangements. By tracking partner ID on a per-transaction basis, the system enables creation of sophisticated partner revenue-sharing models. The field is defined to be a number (integer) of 14 significant digits and is constrained to be not null. Finally, the table includes a TIME_DIM_ID field that is for storing information for the partner about the day, week, month, quarter, and year in which the transaction took place.

The ECOM_TRANSACTION_SUMMARY_T table 420 tracks completed e-commerce transaction information. Information tracked includes user type (e.g., "member" or "guest"), user ID, order ID (unique ID for a given order transaction), total amount, tax, date of transaction, user ZIP code, destination address with ZIP code, and e-mail address. Thus, the table provides a summary of e-commerce information, primarily from a corresponding order table, ORDER_T.

The table may be created using the following SQL statement:

```
CREATE TABLE ECOM_TRANSACTION_SUMMARY_T(
    USER_ID             NUMBER(14, 0)   NOT NULL,
    EXTERNAL_USER_ID    VARCHAR2(50),   NULL
    ORDER_ID            NUMBER(14, 0)   NOT NULL,
    USER_TYPE           CHAR(10)        DEFAULT 'UNKNOWN' NOT NULL,
    EMAIL_ADDRESS       VARCHAR2(100),
    CREATE_DATE         DATE            NOT NULL,
    TOTAL_AMOUNT        NUMBER(6, 2)    DEFAULT 0 NOT NULL,
    DISTRICT_TAX        NUMBER(6, 2)    DEFAULT 0 NOT NULL,
    STATE_TAX           NUMBER(6, 2)    DEFAULT 0 NOT NULL,
    COUNTY_TAX          NUMBER(6, 2)    DEFAULT 0 NOT NULL,
    CITY_TAX            NUMBER(6, 2)    DEFAULT 0 NOT NULL,
    USER_ZIP            CHAR(10),
    DESTINATION_ZIP     CHAR(10),
    PARTNER_ID          NUMBER(14, 0)   NOT NULL,
    TIME_DIM_ID         DATE            NOT NULL,
    CHECK (IN( 'MEMBER', 'GUEST', 'UNKNOWN' ))
)
```

As shown, the table includes a USER_ID field that is the same USER_ID used throughout all tables and is created upon the first creation of a user account. The field is defined to be a number (integer) of 14 significant digits and is constrained to be not null. The next field is EXTERNAL_USER_ID field which is used to identify the partner's user. The field is defined to be a variable-length character (VARCHAR2) field of 50 characters maximum and can be left null. The next field is ORDER_ID field and it gets generated when a user engages in an e-commerce transaction. The field is defined to be a number (integer) of 14 significant digits and is constrained to be not null. The USER_TYPE field signifies a type of user, currently defined to be either a "Member" or "Guest". The field is defined as a character (CHAR) field of 10 characters maximum. It is specified to be default "unknown" and is constrained to be not null. If USER_TYPE="GUEST", then the EMAIL_ADDRESS (described below) is employed as the user identifier. If USER_TYPE="MEMBER", then USER_ID is set to the appropriate user identifier for the particular user. The EMAIL_ADDRESS field captures a standard email address. The field is defined as a variable-length character (VARCHAR2) field of 100 characters maximum. The CREATE_DATE field stores date information about when the e-commerce transaction (summary) entry was created; it is constrained to be not null.

The following fields pertain to specific sales transaction information (e.g., dollar amount and taxes). The TOTAL_AMOUNT field represents the total dollar amount of the e-commerce transaction. The field is defined to be a number (integer) of 6 significant digits and is constrained to be not null. By default, it is set to a value of 0. The next four fields pertain to taxes: DISTRICT_TAX, STATE_TAX, COUNTY_TAX, and CITY_TAX. These fields may be defined to be a field type comprising a number (integer) of 6 significant digits that is constrained to be not null. By default, it is set to a value of 0. The next field is USER_ZIP field. It is used for identifying where the user is located. The field is defined to be a character (CHAR) field of 10 characters maximum. In a similar manner, the DESTINATION_ZIP field is used for identifying where the e-commerce shipment is destined. It is also defined to be a character (CHAR) field of 10 characters maximum.

The next field is PARTNER_ID field which is the same PARTNER_ID employed across all tables. It represents a unique partner for the purposes of billing or crediting arrangements. The field is defined to be a number (integer) of 14 significant digits and is constrained to be not null. Finally, the table includes a TIME_DIM_ID field that is for storing information for the partner about the day, week, month, quarter, and year in which the transaction took place. It is constrained to be not null.

The LOGIN_LOG_T table 425 provides tracking information about each time a user logs into (i.e., accesses) the system. This information may be obtained by parsing web site log files, such as Apache log files. In a complementary fashion, the system tracks when the user logs out, using, for instance, an HTTP session ID (or browser cookie) to find out when the user logged out. In this manner, the table tracks access information across multiple entries for different users.

In an exemplary embodiment, the table may be created using the following SQL statement:

```
CREATE TABLE LOGIN_LOG_T(
    USER_ID             NUMBER(14, 0),
    SESSION_ID          VARCHAR2(50),   NULL
    LOGIN_TIME          DATE,
    ACCEPT_LANGUAGE     VARCHAR2(255),
    REFERER             VARCHAR2(255),
    USER_AGENT          VARCHAR2(255),
    LAST_ACCESS_TIME    DATE,
    PARTNER_ID          NUMBER(14, 0)   NOT NULL,
    TIME_DIM_ID         DATE            NOT NULL
)
```

As shown, the table includes a USER_ID field which is the same USER_ID across all tables. As previously described, it gets generated and auto-incremented at the commencement of a media gateway transaction which occurs when a media asset (e.g., photo) is uploaded to the site. The field is defined to be a number (integer) of 14 significant digits. Next, the SESSION_ID field represents a session ID that a user gets assigned each time he or she logs in. The field is defined to be a variable-length character (VARCHAR2) field of 50 characters maximum and may be left null. The LOGIN_TIME field represents the time the login started. It is a timestamp (Oracle "DATE") field type. The next field is ACCEPT_LANGUAGE field and is used for describing acceptable languages (and hence corresponding character sets) for the login. Additionally, the field can capture data such as host type (e.g., WAP, HTTP, or the like). The field is defined to be a variable-length character (VARCHAR2) field of 255 characters maximum. The REFERRER field is used to describe a referring party that has referred the user. The field is defined to be a variable-length character (VARCHAR2) field of 255 characters maximum. The USER_AGENT field specifies a particular browser; this may be determined from an HTTP header. The field is defined to be a variable-length character (VARCHAR2) field of 255 characters maximum. The LAST_ACCESS_TIME field is used for maintaining a history of every time a user logs into the system; it stores a timestamp.

The next field is PARTNER_ID field. It represents a unique partner for the purposes of billing or crediting arrangements. The field is defined to be a number (integer) of 14 significant digits and is constrained to be not null. Finally, the table includes a TIME_DIM_ID field that is for storing information for the partner about the day, week, month, quarter, and year in which the transaction took place and is constrained to be not null.

SHARE_LOG_T table 450 tracks how a particular user shares a media asset, such as photo(s), an album, a flash-based movie built up of photos, or the like. Anytime a user "shares," the system captures information about who (what user) is sharing, what type of device the user is using to initiate the share, what media asset or object (e.g., photo) is being shared, and who (i.e., recipient) the object is being share with. This information includes, for example, a system-generated share ID (e.g., number for uniquely identifying the sharing session), a host type (e.g., camera device, PDA, cell phone, desktop computer, or the like), and a host ID (e.g., camera ID). Also tracked is a sharing time and a sharing type (e.g., photo sharing, movie sharing, or the like). The table in turn links to other dependent tables that specify additional information about the sharing event, including information about the target (i.e., sharing recipient).

The table may be created using the following SQL statement:

```
CREATE TABLE SHARE_LOG_T(
    SHARE_ID            NUMBER(14, 0)    NOT NULL,
    USER_ID             NUMBER(14, 0),
    HOST                VARCHAR2(50)     NOT NULL,
    HOST_TYPE           VARCHAR2(10),
    SHARE_DATE_TIME     DATE,
    SHARE_TYPE          CHAR(10),
    PARTNER_ID          NUMBER(14, 0)    NOT NULL,
    TIME_DIM_ID         DATE             NOT NULL,
CONSTRAINT PK2 PRIMARY KEY (SHARE_ID)
)
```

As shown, the table includes a SHARE_ID field which is an auto-incremented unique identifier representing a user event requesting the share. This field is specified as the primary key for the table. The field is defined to be a number (integer) of 14 significant digits and is constrained to be not null. The next field is the previously-encountered USER_ID field, which stores a user ID that is generated upon the first creation of a user account. The field is defined to be a number (integer) of 14 significant digits. The HOST field is used to represent a multitude of possible different sites users could have come from. The field is defined to be a variable-length character (VARCHAR2) field of 50 characters maximum and is constrained to be not null. The HOST_TYPE field includes such host types as website, wireless phone, and camera from which a user could have come. The field is defined to be a variable-length character (VARCHAR2) field of 10 characters maximum.

The next field is SHARE_DATE_TIME field and is the date of when the share occurred. Following this is the SHARE_TYPE field, for characterizing a type of share (e.g., sharing photos). Other types include the previously-described media assets, including video (e.g., MPEG) files, audio (e.g., MP3) files, or the like. If desired, the field may be used to define more restrictive types of shares, but typically it is configured to provide read-level access to any asset the user decides to share with other users. The field is defined to be a character (CHAR) field of 10 characters maximum.

The next field is PARTNER_ID field that represents a unique partner for the purposes of billing or crediting arrangements, as previously described. The field is defined to be a number (integer) of 14 significant digits and is constrained to be not null. Finally, the table includes the previously-mentioned TIME_DIM_ID field which is used for storing information for the partner about the day, week, month, quarter, and year in which the transaction took place and is constrained to be not null.

The SHARE_TARGET_INFO_T table 455 is an ancillary table that includes data characterizing the target (i.e., recipient) for the sharing event. It may be linked to the SHARE_LOG_T table, using SHARE_ID. The table itself may be created using the following SQL statement:

```
CREATE TABLE SHARE_TARGET_INFO_T(
    SHARE_TARGET_INFO_ID    NUMBER(14, 0)    NOT NULL,
    SHARE_ID                NUMBER(14, 0)    NOT NULL,
    TARGET_EMAIL_ADDRESS    VARCHAR2(100),   NULL
    TARGET_USER_NAME        VARCHAR2(50),    NULL
CONSTRAINT PK5 PRIMARY KEY (SHARE_TARGET_INFO_ID)
)
```

As shown, the table includes a SHARE_TARGET_INFO_ID field that is a unique identifier that is generated and auto-incremented every time a share for a particular media asset is generated. This field is specified as the primary key for the table. The field is defined to be a number (integer) of 14 significant digits and is constrained to be not null. The next field is SHARE_ID field which is an auto-incremented unique identifier representing a user event requesting the share. The field is defined to be a number (integer) of 14 significant digits and is constrained to be not null. The next two fields characterize the target user. The TARGET_EMAIL_ADDRESS field stores the email address for the target (recipient) who the user wants to allow to sharing with. The field is defined to be a variable-length character (VARCHAR2) field of 100 characters maximum and may be left null. Finally, the table includes a TARGET_USER_NAME field which stores a user name for the target. It can store the target user name's first name, last name, or it can be left null. The field is defined to be a variable-length character (VARCHAR2) field of 50 characters maximum.

SHARE_TARGET_VIEW_T table 460 is another ancillary share-information table. It records the details of a viewing of a shared object by a person recorded in the above-mentioned SHARE_TARGET_INFO_T table. In an exemplary embodiment, the SHARE_TARGET_VIEW_T table may be created using the following SQL statement:

```
CREATE TABLE SHARE_TARGET_VIEW_T(
    SHARE_TARGET_INFO_ID    NUMBER(14, 0)    NOT NULL,
    VIEWED_DATE_TIME        DATE             NOT NULL,
    DEVICE_INFO             VARCHAR2(255)    NULL
)
```

As shown, the table includes a SHARE_TARGET_INFO_ID field that provides a unique ID for each share-viewing event. The field is defined to be a number (integer) of 14 significant digits and is constrained to be not null. The next field is VIEWED_DATE_TIME field which provides data on when a user came back to view the asset. The field is constrained to be not null. Finally, the table includes a DEVICE_INFO field that is used for recording the particular device used in the share-viewing event. The field is defined to be a variable-length character (VARCHAR2) field of 255 characters maximum and may be left null.

The UBER_PARTNER_T table 470 generally describes the parent company for a set of PARTNERs, for instance, UBER_PARTNER="KODAK". The table may be created using the following SQL statement:

```
CREATE TABLE UBER_PARTNER_T(
    UBER_PARTNER_ID      NUMBER(14, 0)      NOT NULL,
    UBER_PARTNER_NAME    VARCHAR2(255),     NULL
    CONSTRAINT PKUBER_PARTNER_T PRIMARY KEY (UBER_PARTNER_ID)
)
```

As shown, the table includes a UBER_PARTNER_D field that is used for uniquely identifying each such parent company or similar entity. This field is specified as the primary key for the table. The field is defined to be a number (integer) of 14 significant digits and is constrained to be not null. The UBER_PARTNER_NAME field stores a text string for the parent company. The field is defined to be a variable-length character (VARCHAR2) field of 255 characters maximum and may be left null.

The PARTNER_T table 440 includes the various partners under the above-mentioned "uber" partner, such as the "CVS" subsidiary or sub-partner of "KODAK". The table may be created using the following SQL statement:

```
CREATE TABLE PARTNER_T(
    PARTNER_ID        NUMBER(14, 0)    NOT NULL,
    UBER_PARTNER_ID   NUMBER(14, 0)    NOT NULL,
    PARTNER_NAME      VARCHAR2(255),
    CONSTRAINT PKPARTNER_T PRIMARY KEY (PARTNER_ID)
)
```

As shown, the table includes a PARTNER_ID field that uniquely represents a partner for the purposes of billing or crediting arrangements, or other partner-related activities. This field is specified as the primary key for the table. The field is defined to be a number (integer) of 14 significant digits and is constrained to be not null. The next field is UBER_PARTNER_ID field which is used for linking this partner to a particular "uber" partner (e.g., parent company). The field is defined to be a number (integer) of 14 significant digits and is constrained to be not null. Finally, the table includes a PARTNER_NAME field that simply stores a text string for the partner name. The field is defined to be a variable-length character (VARCHAR2) field of 255 characters maximum.

The PARTNER_AGREEMENT_T table 435 includes data that generally describe a legal agreement (e.g., e-commerce revenue-sharing agreement) involving the PARTNERs. An agreement is enforced through a set of calculations, which are specified in AGREEMENT_STEP_T (described below). The PARTNER_AGREEMENT_T table may be created using the following SQL statement:

```
CREATE TABLE PARTNER_AGREEMENT_T(
         PARTNER_AGREEMENT_ID            NUMBER(14, 0)     NOT NULL,
         PARTNER_ID                      NUMBER(14, 0)     NOT NULL,
         PARTNER_AGREEMENT_DESCRIPTION   VARCHAR2(500)     NOT NULL,
CONSTRAINT PKPARTNER_AGREEMENT_T PRIMARY KEY (PARTNER_AGREEMENT_ID)
)
```

As shown, the table includes a PARTNER_AGREEMENT_ID field that is unique ID for representing a particular partner agreement. The field is defined to be a number (integer) of 14 significant digits. This field is specified as the primary key for the table and is constrained to be not null. The PARTNER_ID field represents a particular partner that is associated, for the purposes of billing or crediting arrangements, with a given agreement. The field is defined to be a number (integer) of 14 significant digits and is constrained to be not null. Finally, the table includes a PARTNER_AGREEMENT_DESCRIPTION field that is used for providing a text description of the agreement, such as "Sprint/Kodak Revenue-Sharing Agreement." The field is defined to be a variable-length character (VARCHAR2) field of 500 characters maximum and is constrained to be not null.

The AGREEMENT_STEP_T table 410 is an ancillary agreement table that documents the method steps (program logic) required to effect the business logic of a given agreement, such as calculating revenue-sharing value(s) for a given e-commerce transaction. The table may be created using the following SQL statement:

to apply to effect the agreement step. This is done by identifying a particular named procedure, method, or function (e.g., stored procedure, Java method, or the like) that is used to carry out the agreement step (i.e., specific business logic). The field is defined to be a variable-length character (VARCHAR2) field of 100 characters maximum and is constrained to be not null. The next field is PROCEDURE_PARAM_LIST field; this stores a list of parameters (i.e., values) that are used when invoking the program logic specified by the PROCEDURE_NAME field. The field is defined to be a variable-length character (VARCHAR2) field of 255 characters maximum and may be left null. Finally, the table includes an AGREEMENT_TRANS_TYPE_REF_ID field that is defined to be a number (integer) of 14 significant digits and is constrained to be not null. The field is used to link to the AGREEMENT_TRANS_TYPE_REF_T table 415.

The AGREEMENT_TRANS_TYPE_REF_T table 415, in turn, simply contains "DEBIT" and "CREDIT" values. It may be created using the following SQL statement:

```
CREATE TABLE AGREEMENT_STEP_T(
         PARTNER_AGREEMENT_ID            NUMBER(14, 0)     NOT NULL,
         AGREEMENT_STEP_KEY              NUMBER(4, 0)      NOT NULL,
         PROCEDURE_NAME                  VARCHAR2(100)     NOT NULL,
         PROCEDURE_PARAM_LIST            VARCHAR2(255),    NULL
         AGREEMENT_TRANS_TYPE_REF_ID     NUMBER(14, 0)     NOT NULL,
CONSTRAINT PKAGREEMENT_STEP_T PRIMARY KEY
(PARTNER_AGREEMENT_ID,AGREEMENT_STEP_KEY)
)
```

As shown, the table includes a PARTNER_AGREEMENT_ID field which is the above-mentioned partner agreement ID, thus allowing this table to link back to the PARTNER_AGREEMENT_T table 435. The field is defined to be a number

```
CREATE TABLE AGREEMENT_TRANS_TYPE_REF_T(
         AGREEMENT_TRANS_TYPE_REF_ID NUMBER(14, 0)  NOT NULL,
         AGREEMENT_TRANS_TYPE_DESC   VARCHAR2(50)   NOT NULL,
CONSTRAINT PKAGREEMENT_TRANS_TYPE_REF_T PRIMARY KEY
(AGREEMENT_TRANS_TYPE_REF_ID)
)
```

(integer) of 14 significant digits and is constrained to be not null. The AGREEMENT_STEP_KEY field serves to identify a particular agreement step (i.e., business logic to apply) for a given partner agreement. This field, together with the PARTNER_AGREEMENT_ID field, forms a composite primary key for the table. The field is defined to be a number (integer) of 4 significant digits and is constrained to be not null. The PROCEDURE_NAME field identifies specific program logic As shown, the table includes an AGREEMENT_TRANS_TYPE_REF_ID field that is used to uniquely identify each credit and debit entry. This is specified as the primary key for the table. The field is defined to be a number (integer) of 14 significant digits and is constrained to be not null. This is followed by the AGREEMENT_TRANS_TYPE_DESC field which is used to store a particular debit or credit. For instance, a simple example of posting a debit and then a credit is illustrated by the following SQL statements:
insert into AGREEMENT_TRANS_TYPE_REF_T values(1, 'DEBIT');
insert into AGREEMENT_TRANS_TYPE_REF_T values(2, 'CREDIT');
The type description field itself is defined to be a variable-length character (VARCHAR2) field of 50 characters maximum and is constrained to be not null.

The PHOTO_TRANSACTION_LOG_T table 445 enumerates the various media assets, such as digital photos, that are uploaded during a media gateway transaction (i.e., during posting to MEDIA_GATEWAY_TRANSACTION_LOG_T). The table may be created using the following SQL statement:

```
CREATE TABLE PHOTO_TRANSACTION_LOG_T(
    MEDIA_GATEWAY_TRANS_LOG_ID    NUMBER(14, 0)    NOT NULL,
    PHOTO_ID                      NUMBER(14, 0)    NOT NULL,
CONSTRAINT PKPHOTO_TRANSACTION_LOG_T PRIMARY KEY
(MEDIA_GATEWAY_TRANS_LOG_ID)
)
```

As shown, the table includes a MEDIA_GATEWAY_TRANS_LOG_ID field that is used to uniquely identify the media asset event. This field is specified as the primary key for the table. The field is defined to be a number (integer) of 14 significant digits and is constrained to be not null. The next field is PHOTO_ID field which is used for identifying a specific media asset. The field is defined to be a number (integer) of 14 significant digits and is constrained to be not null.

The TIME_DIM_T table 465 is a time dimension table. This implements a simplified and efficient interface for queries on specific date ranges. Date columns storing time portions of the date are stored in fact tables (tables which make foreign key references to this table). The table may be created using the following SQL statement:

```
CREATE TABLE TIME_DIM_T(
    TIME_DIM_ID    DATE             NOT NULL,
    DAY            DATE,
    WEEK           NUMBER(2, 0)     NOT NULL,
    MONTH          NUMBER(2, 0)     NOT NULL,
    QUARTER        NUMBER(2, 0)     NOT NULL,
    YEAR           NUMBER(5, 0)     NOT NULL,
CONSTRAINT PK10 PRIMARY KEY (TIME_DIM_ID)
)
```

As shown, the table includes a TIME_DIM_ID field that is for storing an identifying timestamp. This field is specified as the primary key for the table; it is constrained to be not null. The DAY field is for storing a day date. The WEEK field is used for a week as a number. The field is defined to be a number (integer) of 2 significant digits and is constrained to be not null. Similarly, the MONTH and QUARTER fields store numeric representations of month and quarter, respectively. These fields are defined to be a number (integer) of 2 significant digits and are constrained to be not null. Finally, the table includes a YEAR field for storing a numeric year. The field is defined to be a number (integer) of 5 significant digits and is constrained to be not null.

Figure 4B:
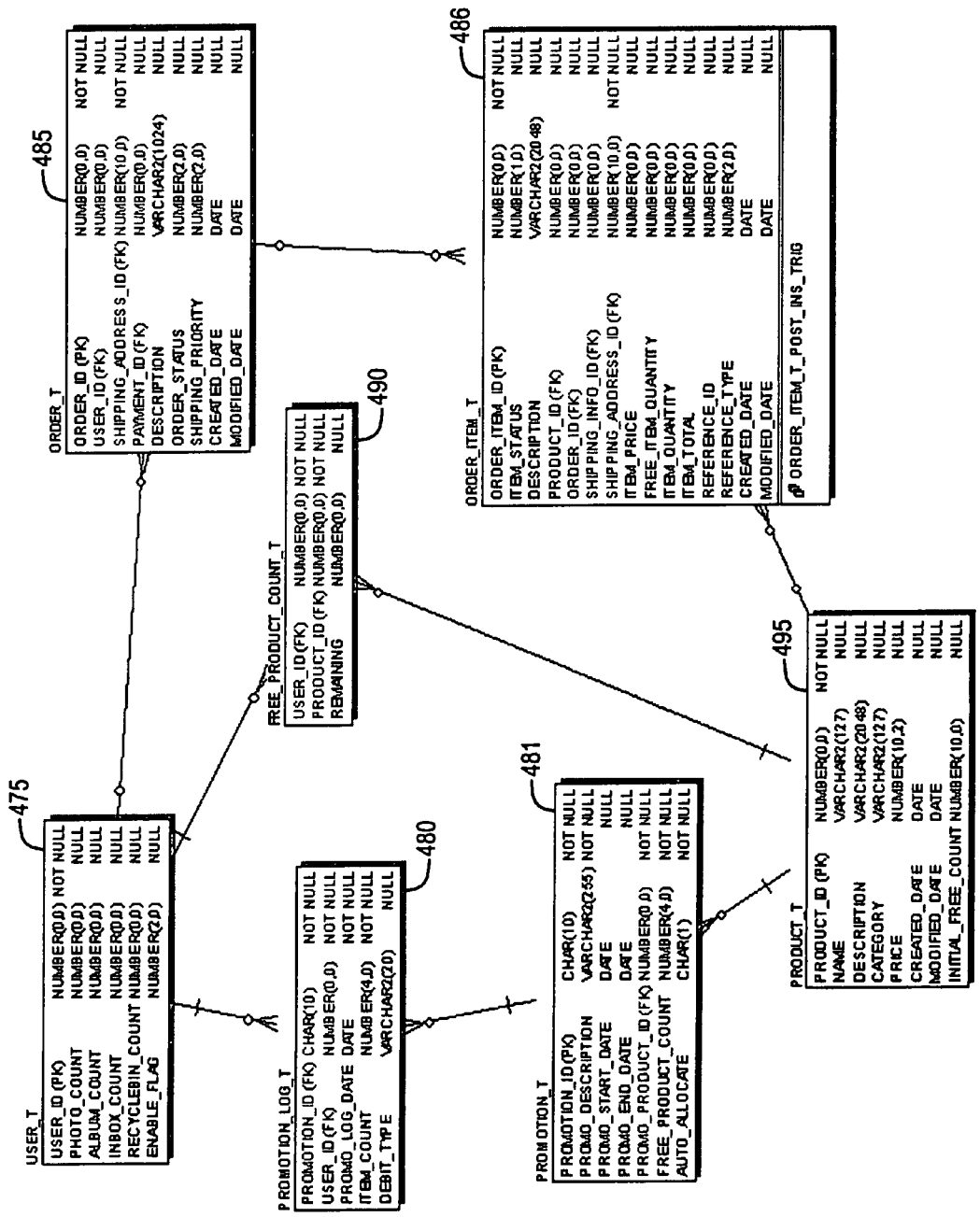

Ancillary tables are shown in FIG. 4B. The USER_T table 475 generally characterizes the media assets owned and shared by a given user. It may be created using the following SQL statement:

```
CREATE TABLE USER_T(
    USER_ID            NUMBER        NOT NULL,
    PHOTO_COUNT        NUMBER,
    ALBUM_COUNT        NUMBER,
    INBOX_COUNT        NUMBER,
    RECYCLEBIN_COUNT   NUMBER,
    ENABLE_FLAG        NUMBER(2, 0),
CONSTRAINT USER_PRIM PRIMARY KEY (USER_ID)
)
```

As shown, the table includes a USER_ID field that is the previously-described unique user identifier. This field is specified as the primary key for the table. The field is defined to be number (integer) that is constrained to be not null. The PHOTO_COUNT field is used to track the number of media assets (e.g., photos) that a given user currently "owns" (i.e., controls). The field is defined to be a number (integer). The ALBUM_COUNT field tracks how many online albums (i.e., user-specified grouping of media assets) exist for a given user. The field is defined to be a number (integer). The INBOX_COUNT field is the number of active photos of an account.

The field is defined to be a number (integer). The RECYCLEBIN_COUNT field is a number (integer) field that tracks how many objects a given user has marked for deletion. Finally, the table includes an ENABLE_FLAG field that is used to boolean-enable or disable a user account. The field is defined to be a number (integer) of 2 significant digits.

The PROMOTION_LOG_T table 480 generally stores promotion information, as it relates to a particular user (i.e., doing an e-commerce transaction). It may be created using the following SQL statement:

```
CREATE TABLE PROMOTION_LOG_T(
        PROMOTION_ID    CHAR(10)       NOT NULL,
        USER_ID         NUMBER         NOT NULL,
        PROMO_LOG_DATE  DATE           NOT NULL,
        ITEM_COUNT      NUMBER(4, 0)   NOT NULL,
        DEBIT_TYPE      VARCHAR2(20)
```

As shown, the table includes a PROMOTION_ID field that is used to uniquely identify a particular promotion. The field is defined to be a character (CHAR) field of 10 characters maximum and is constrained to be not null. The next field is USER_ID field, which comprises the previously-described user ID. The field is defined to be a number (integer) and is constrained to be not null. The PROMO_LOG_DATE field is a date field that logs a date for the promotion and is constrained to be not null. The next field is ITEM_COUNT field that is used to describe how many items are involved with the promotion. The field is defined to be a number (integer) of 4 significant digits and is constrained to be not null. Finally, the table includes a DEBIT_TYPE field that is used to specify a debit type, for instance, for indicating what free product remains (e.g., by showing whether the promotion is on or not). The field is defined to be a variable-length character (VARCHAR2) field of 20 characters maximum.

The PROMOTION_T table 481 stores information about individual promotions. It may be created using the following SQL statement:

```
CREATE TABLE PROMOTION_T(
        PROMOTION_ID        CHAR(10)        NOT NULL,
        PROMO_DESCRIPTION   VARCHAR2(255)   NOT NULL,
        PROMO_START_DATE    DATE,
        PROMO_END_DATE      DATE,
        PROMO_PRODUCT_ID    NUMBER          NOT NULL,
        FREE_PRODUCT_COUNT  NUMBER(4, 0)    NOT NULL,
        AUTO_ALLOCATE       CHAR(1)         NOT NULL,
CONSTRAINT PROMOTION_PRIM PRIMARY KEY (PROMOTION_ID)
```

As shown, the table includes a PROMOTION_ID field that uniquely identifies each given promotion. This field is specified as the primary key for the table. The field is defined to be a character (CHAR) field of 10 characters maximum and is constrained to be not null. The next field is PROMO_DESCRIPTION field, which is simply a text field used to describe the promotion. The field is defined to be a variable-length character (VARCHAR2) field of 255 characters maximum and is constrained to be not null. The PROMO_START_DATE field and the PROMO_END_DATE field are date fields that store start and end dates, respectively, for a given promotion. The PROMO_PRODUCT_ID field stores a product ID that is associated with a given promotion. The field is defined to be a number (integer) and is constrained to be not null. The FREE_PRODUCT_COUNT field is used to store a count of free promotional product for the given promotion. The field is defined to be a number (integer) of 4 significant digits and is constrained to be not null. Finally, the table includes an AUTO_ALLOCATE field that is used to describe how the free products are allocated in a promotion. The field is defined to be a character (CHAR) field of 1 character maximum and is constrained to be not null.

The PRODUCT_T table 495 stores information about different products and may be created using the following SQL statement:

```
CREATE TABLE PRODUCT_T(
        PRODUCT_ID          NUMBER          NOT NULL,
        NAME                VARCHAR2(127),
        DESCRIPTION         VARCHAR2(2048),
        CATEGORY            VARCHAR2(127),
        PRICE               NUMBER(10, 2),
        CREATED_DATE        DATE,
        MODIFIED_DATE       DATE,
        INITIAL_FREE_COUNT  NUMBER(10, 0),
CONSTRAINT PRODUCT_PRIM PRIMARY KEY (PRODUCT_ID)
)
```

As shown, the table includes a PRODUCT_ID field that is used to uniquely identify each product. This field is the specified primary key for this table. The field is defined to be a number (integer) and is constrained to be not null. The NAME, DESCRIPTION, and CATEGORY fields simply store corresponding text strings for a given product. The NAME field is defined to be a variable-length character (VARCHAR2) field of 127 characters maximum. The DESCRIPTION field is defined to be a variable-length character (VARCHAR2) field of 2048 characters maximum. The CATEGORY field is defined to be a variable-length character (VARCHAR2) field of 127 characters maximum. The PRICE field is used to specify the current price. The field is defined to be a number (integer) of 10 significant digits. The CREATED_DATE and MODIFIED_DATE fields are date fields storing creation and modification date information, respectively. Finally, the table includes an INITIAL_FREE_COUNT field that is used to describe the number of free promotional items available for a given product. The field is defined to be a number (integer) of 10 significant digits.

The ORDER_T table 485 stores basic order information. It may be created using the following SQL statement:

```
CREATE TABLE ORDER_T(
    ORDER_ID            NUMBER              NOT NULL,
    USER_ID             NUMBER,
    SHIPPING_ADDRESS_ID NUMBER(10, 0)       NOT NULL,
    PAYMENT_ID          NUMBER,
    DESCRIPTION         VARCHAR2(1024),
    ORDER_STATUS        NUMBER(2, 0),
    SHIPPING_PRIORITY   NUMBER(2, 0),
    CREATED_DATE        DATE,
    MODIFIED_DATE       DATE,
    CONSTRAINT ORDER_PRIM PRIMARY KEY (ORDER_ID)
)
```

As shown, the table includes an ORDER_ID field that is used to uniquely identify a given order. This field is the specified primary key for this table. The field is defined to be a number (integer) and is constrained to be not null. The next field is USER_ID field, which stores the previously-described user ID. This allows an order to be associated with a given user. The field is defined to be a number (integer). Other pertinent information includes: SHIPPING_ADDRESS_ID, PAYMENT_ID, DESCRIPTION, ORDER_STATUS, and SHIPPING_PRIORITY fields. The information that each stores is self-evident. The SHIPPING_ADDRESS_ID field is defined to be a number (integer) of 10 significant digits and is constrained to be not null. The PAYMENT_ID field is defined to be a number (integer). The DESCRIPTION field is defined to be a variable-length character (VARCHAR2) field of 1024 characters maximum. The ORDER_STATUS field is defined to be a number (integer) of 2 significant digits. The SHIPPING_PRIORITY field is defined to be a number (integer) of 2 significant digits. The CREATED_DATE field and MODIFIED_DATE field are date fields storing creation and modification information, respectively.

Each order is associated with one or more order items. Accordingly, the ORDER_ITEM_T table 486 tracks order item information. It may be created using the following SQL statement:

As shown, the table includes an ORDER_ITEM_ID field that is used to uniquely identify each order item. This field is the specified primary key for this table. The field is defined to be a number (integer) and is constrained to be not null. The remaining fields are simply order-entry information pertaining to each order item. These fields include: ITEM_STATUS field that is defined to be a number (integer) of 1 significant digit, DESCRIPTION field that is defined to be a variable-length character (VARCHAR2) field of 2048 characters maximum, PRODUCT_ID field that is defined to be a number (integer), ORDER_ID field that is defined to be a number (integer), SHIPPING_INFO_ID field that is defined to be a number (integer), SHIPPING_ADDRESS_ID field that is defined to be a number (integer) of 10 significant digits and is constrained to be not null, ITEM_PRICE field that is defined to be a number (integer), FREE_ITEM_QUANTITY field that is defined to be a number (integer), ITEM_QUANTITY field that is defined to be a number (integer), ITEM_TOTAL field that is defined to be a number (integer), REFERENCE_ID field that is defined to be a number (integer), REFERENCE_TYPE field that is defined to be a number (integer) of 2 significant digits, and CREATED_DATE field and MODIFIED_DATE field that are date fields for storing creation and modification information, respectively.

Finally, the FREE_PRODUCT_COUNT_T table 490 tracks information about free product given to a particular user. It may be created using the following SQL statement:

```
CREATE TABLE ORDER_ITEM_T(
    ORDER_ITEM_ID       NUMBER              NOT NULL,
    ITEM_STATUS         NUMBER(1, 0),
    DESCRIPTION         VARCHAR2(2048),
    PRODUCT_ID          NUMBER,
    ORDER_ID            NUMBER,
    SHIPPING_INFO_ID    NUMBER,
    SHIPPING_ADDRESS_ID NUMBER(10, 0)       NOT NULL,
    ITEM_PRICE          NUMBER,
    FREE_ITEM_QUANTITY  NUMBER,
    ITEM_QUANTITY       NUMBER,
    ITEM_TOTAL          NUMBER,
    REFERENCE_ID        NUMBER,
    REFERENCE_TYPE      NUMBER(2, 0),
    CREATED_DATE        DATE,
    MODIFIED_DATE       DATE,
    CONSTRAINT ORDER_ITEM_PRIM PRIMARY KEY (ORDER_ITEM_ID)
)
```

```
CREATE TABLE FREE_PRODUCT_COUNT_T(
        USER_ID      NUMBER    NOT NULL,
        PRODUCT_ID   NUMBER    NOT NULL,
        REMAINING    NUMBER
)
```

As shown, the table includes the previously-described USER_ID and PRODUCT_ID fields, which are both defined to be a number (integer) and are constrained to be not null. The actual count is maintained in the REMAINING field which is defined to be a number (integer).

E. Transaction Modules

Figure 5:
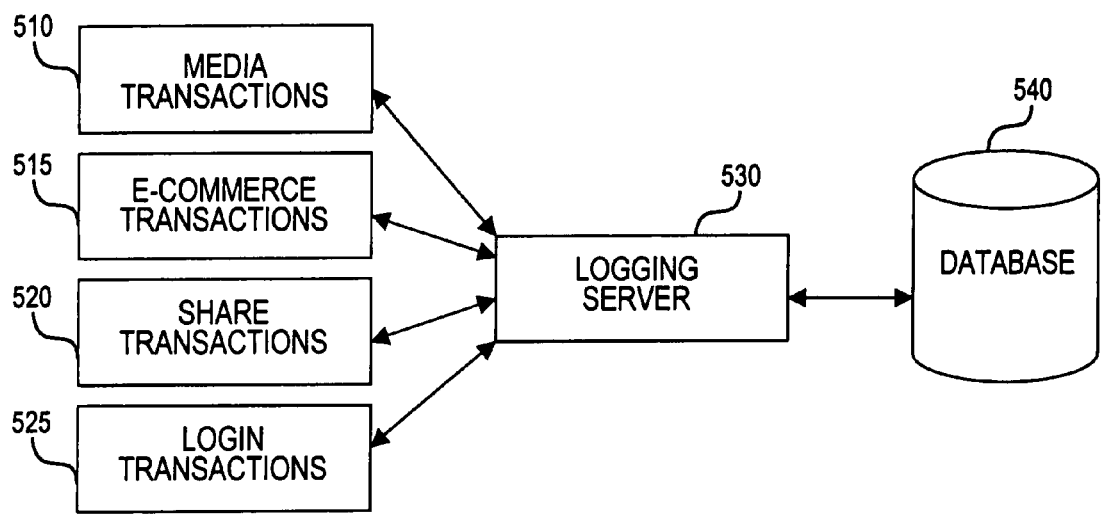
FIG. 5 is a high-level functional block diagram of an asset management or tracking system from the perspective of various transaction modules that provide tracking information.

FIG. 5 presents a high-level functional block diagram of an asset management or tracking system 500 from the perspective of various transaction modules that provide tracking information. As shown, the system 500 includes a media transactions module 510, e-commerce transaction module 515, share transactions module 520, and login transactions module 525. These transaction modules, which correspond to the main information tracking functionality in the system, connect to a logging server 530, which is connected to a back-end database server 540. The logging server 530 functions to: (1) collect all of this information that is tracked by the various modules, reformat that information, and store the reformatted information in the back-end database, and (2) distribute information from the database to be used to support e-commerce activities, including use for a particular purpose by end users, by a company's marketing department, by a company's billing department, or the like. The database server 540 itself serves as a central store or repository of information—storing the tracking information in an Oracle database.

As suggested by the various transaction modules, transactions can occur in the system at different times and at different locations. Regardless of where or when a particular type of transaction is occurring, that transaction may be posted to the logging server 530 by invoking a Java servlet resident on the server via an HTTP call. Example HTTP calls include the following.

Example #1: Media Transaction Posted Via an HTTP Call:
http://AssetTracker/
loggingServer?userid=123&deviceid=456&start=
343434&end=898989&requested=1&transferred=1&
uploaded=499999&partner=321&time=458885555& photoid=436587

Example #2: E-Commerce Transaction Posted Via an HTTP Call:
http://AssetTracker/
loggingServer?userid=123&order=98765&user=GUEST&
email=johnr@yahoo.com&create=456833388&total=24.88&
district=0.00&state=2.44&county=0.00&city=0.00&zip=
95010&dest=95010&partner=123&time=48555777

Example #3: Login Transaction Posted Via an HTTP Call:
http://AssetTracker/
loggingServer?userid=123&session=345A55TT&login=
455888333&lang=english&refer=none&last=23334455&
partner=123&time=555099222

Example #4: Share Transaction Posted Via an HTTP Call:
http://AssetTracker/
loggingServer?userid=123&host=PC&hosttype=NA&
sharetime=5555666&partner=123&time=56667744

In response to receiving such HTTP calls, the logging server 530 (Java servlet) parses and collects the data and writes the data into the database. For instance, the information may be written to the database by an appropriate SQL INSERT command. If desired, each INSERT command may be packaged within a corresponding stored procedure, where the stored procedure has as parameters the same fields as described in the tables, such as illustrated as follows:

MediaGatewayTransactionLogInsert( . . . )
EcomTransactionInsert( . . . )
LoginLogInsert( . . . )
ShareLogInsert( . . . )

If a parameter is passed as null to the stored procedure then no field in the table will be written.

Figure 6:
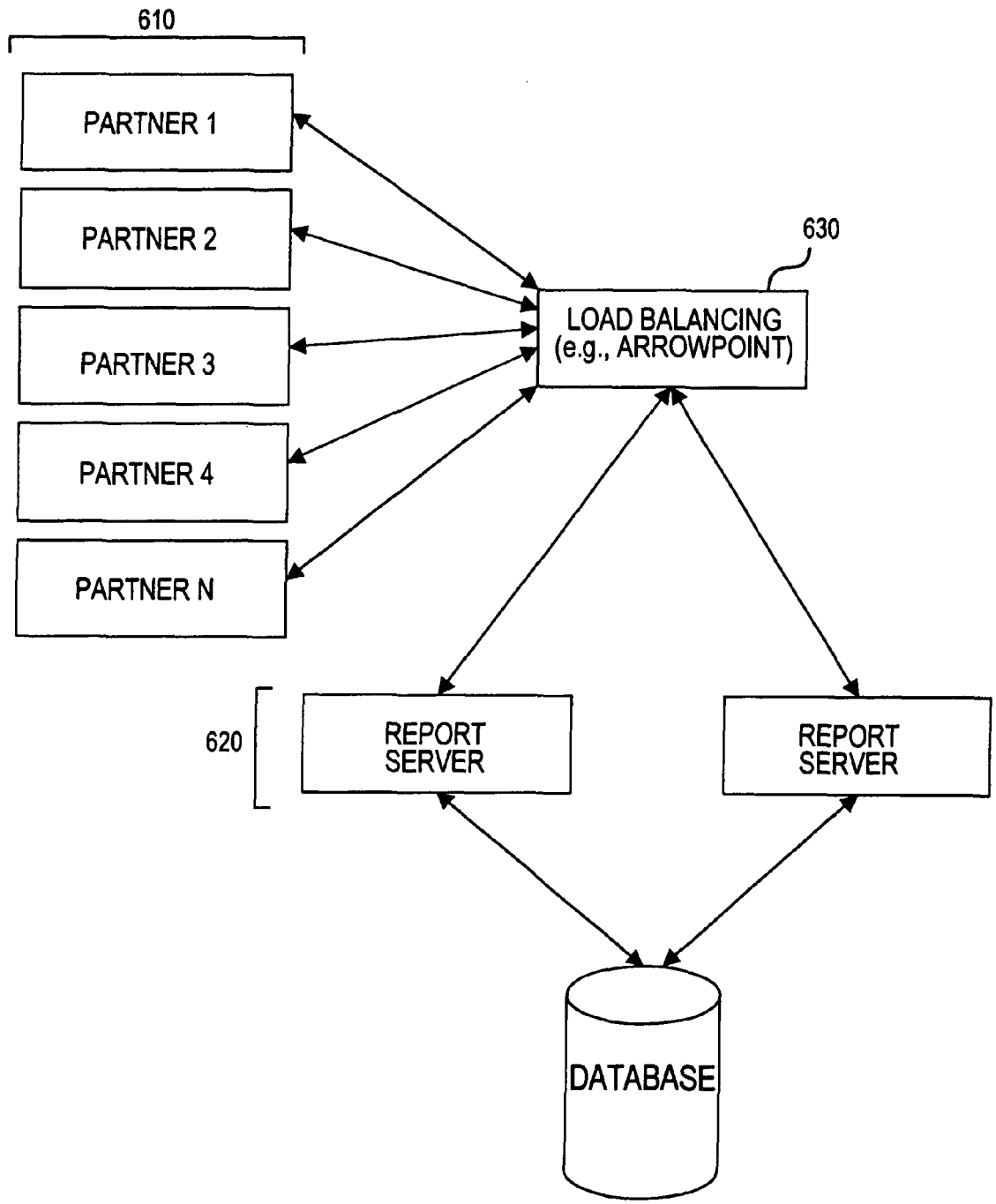
FIG. 6 is a high-level functional block diagram illustrating partner interaction with the asset management system of the present invention.

FIG. 6 is a block diagram illustrating partner interaction with the asset management system of the present invention. A multitude of different partners, as shown at 610, may login to the system for requesting partner-related services, such as billing-decision support services. Here, the partners may obtain different reports that are available from one or more report servers 620. To begin the process, a partner logins to the asset management system so that authenticity is validated. The authenticated partner connects to one of the report servers 620. Coordination of workload among the various asset servers is achieved through the load balancer module 630 (e.g., Cisco's ArrowPoint, available from Cisco Systems of San Jose, Calif.). Load balancing is used so that report generation is balanced between different report servers, based on current demand. The exact number of report servers employed may be gauged depending on the scalability desired. Collectively, the report servers function to extract information from the back-end database for supporting billing and e-commerce purposes, based on submitted (external) authenticated requests.

Of particular interest to partners are accounting reports (i.e., reporting debits/credits pursuant to agreements) as well as user transaction reports so that billing can be audited or performed by a given partner. The latter report reports particular activities of different users, such as system services employed. As with the HTTP-based transaction logging, HTTP is employed for submitting partner report requests. Examples are as follows.

Example #1: Partner Request for an Accounting Report
http://AssetTracker/
reports?type=summary&partner=123&loginid=XXXX&
passwd=YYYYY In response to this request, an XML report (partnerSummary.xml) will be returned to the partner.

Example #2: Partner Request for User Transaction Information
http://AssetTracker/reports?type=users&start=1/1/
2001&end=4/1/
200&partner=123&loginid=XXXX&passwd=YYYYY In this example, the system will return to the partner an XML report (userTrans.xml) from the time period from January 2001 to April 2001; the report describes each user transaction for the time period.

To extract information from the back-end database 540, the (respective) report server 620 employs stored procedures that operate in a complementary fashion into the INSERT stored procedures described previously.

MediaGatewayTransactionLogSelect( . . . )
EcomTransactionSelect( . . . )
LoginLogSelect( . . . )
ShareLogSelect( . . . )

Here, stored procedures simply employ SQL SELECT statements to read one or more rows from the appropriate table for the appropriate partner. Customized versions of the stored procedures may be created for providing partner-customized reports, if desired. Extracted information is reformatted, as required, for distribution in a desired format (e.g., XML, HTML, CDR, or the like).

F. Internal Operation for Collecting Information

1. Login

Figure 7:
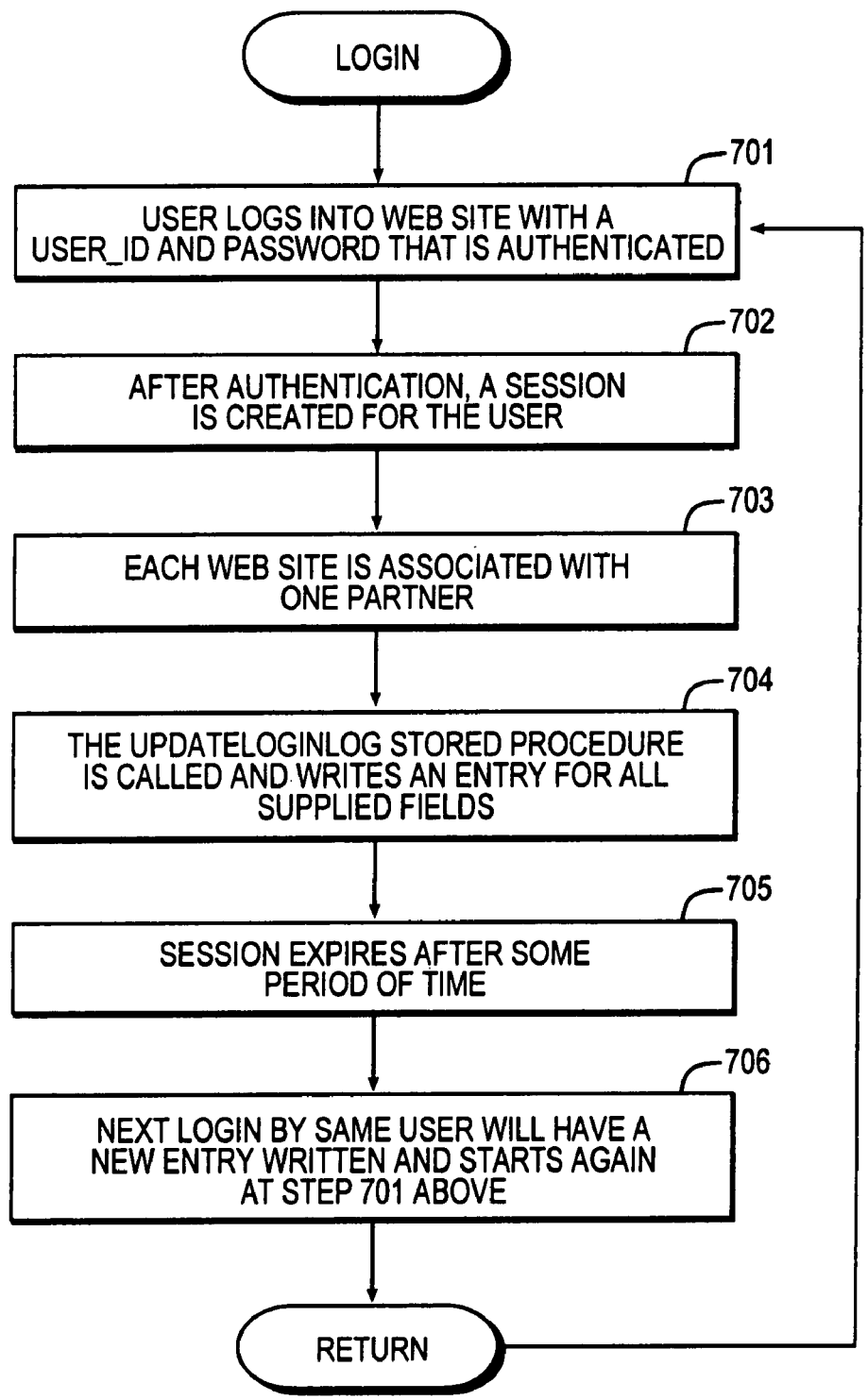
FIG. 7 is a flowchart illustrating the steps that occur that causes an entry in the LOGIN_LOG_T table to be written.

FIG. 7 is a flowchart illustrating the steps that occur that cause an entry in the LOGIN_LOG_T table to be written. As shown at step 701, a user logs into the web site with a user ID (user_id) and password that is authenticated. At step 702, a session is created for the user after authentication. Each web site is associated with one partner, as shown at step 703. At step 704, the stored procedure UpdateLoginLog is called to write an entry for all fields supplied. At step 705, the session expires after some period of time. This procedure concludes with step 706, which shows that the next login by the same user will have a new entry written and starts again at step 701 above.

2. Upload

Figure 8:
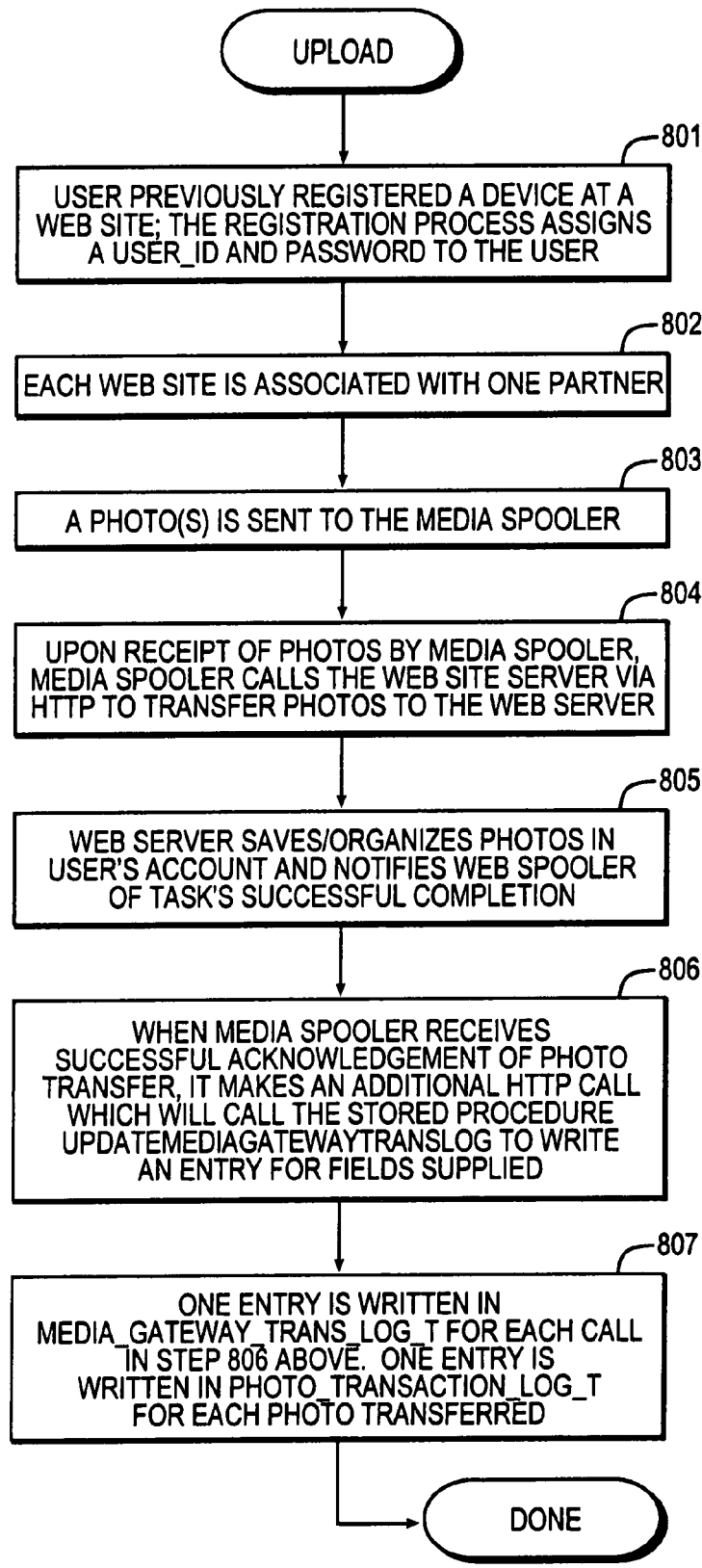
FIG. 8 is a flowchart illustrating the steps that occur for uploading media assets that causes an entry in the MEDIA_GATEWAY_TRANS_LOG_T table to be written.

Several ways exist to upload media assets such as photos. The two main classifications are wireless (e.g., via a camera and cell phone) and wireline (e.g., via a PC and a home telephone). This example is concerned with wireless transmission although wireline transmissions have similar tracking. Additionally, the following example, as illustrated in FIG. 8, uses a photo as an example of a media asset of interest, but the asset could be any media such as an MPEG file, an audio file, digital document, or the like. For the purpose of this discussion, photos are uploaded using the media spooler/gateway (described in detail in the previously-mentioned application Ser. No. 09/759,108). Photos uploaded via the media spooler will cause an entry in the MEDIA_GATEWAY_TRANS_LOG_T to be written.

At step 801, a user has previously registered a device at a web site, which can be a camera, phone, PDA device, or the like which is capable of sending photos via a wireless connection using the media spooler. The registration process assigns a user_id and password to the user. Each web site is associated with one partner, as shown at step 802. At step 803, a photo or set of photos is sent to the media spooler. Upon receipt of the photos by the media spooler, the media spooler calls the web site server via HTTP to transfer the photos to the web server, shown at step 804. At step 805, the web server saves and organizes the photos in the user's account and notifies the web spooler of successful completion of the task. When the media spooler receives a successful acknowledgement of the transfer of the photos, it makes an additional call via HTTP which will, in turn, call a stored procedure UpdateMediaGatewayTransLog to write an entry for all fields supplied, as shown at step 806. Then at step 807, one entry is written in MEDIA_GATEWAY_TRANS_LOG_T for each call in step 806 above. One entry is written in PHOTO_TRANSACTION_LOG_T for each photo transferred.

3. Share

Figure 9:
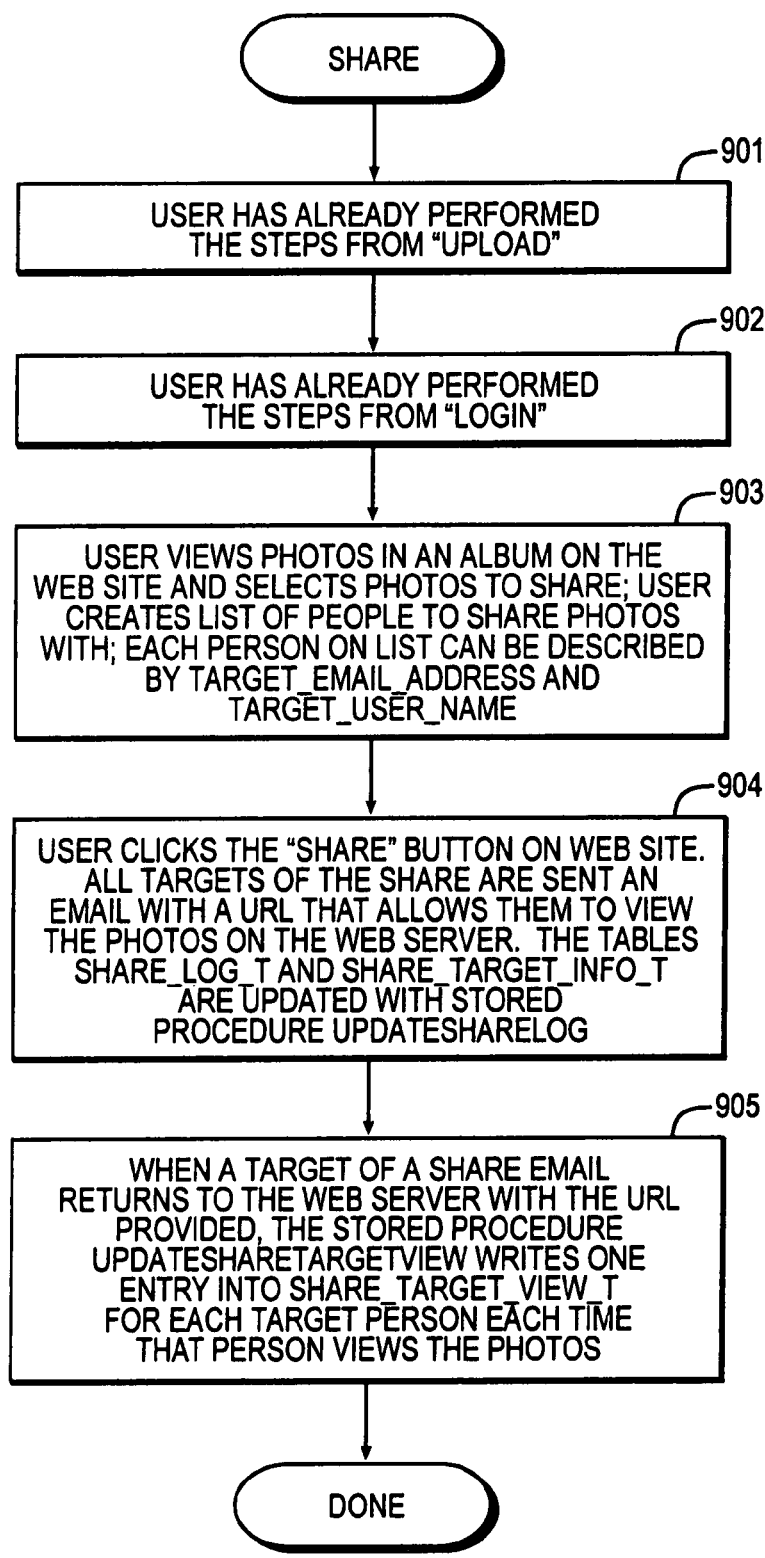
FIG. 9 is a flowchart illustrating the steps that occur that causes an entry in the SHARE_LOG_T table to be written.

FIG. 9 is a flowchart illustrating the steps that occur that causes an entry in the SHARE_LOG_T table to be written. One or more entries in the SHARE_TARGET_INFO_T and the SHARE_TARGET_VIEW_T are also written. At step 901 and 902, a user has already performed the steps from "Upload" and "Login". A user then views the photos in an album on the web site and selects photos to share. The user creates a list of people to share the photos with. Each person to share with can be described by target_email_address and target_user_name, as shown at step 903. At step 904, the user clicks the "share" button on the web site. All targets of the share are sent an email with a URL that allows them to view the photos on the web server. The tables SHARE_LOG_T and SHARE_TARGET_INFO_T are updated with the stored procedure UpdateShareLog. When a target of a share email returns to the web server with the URL provided, the stored procedure UpdateShareTargetView writes one entry into SHARE_TARGET_VIEW_T for each target person each time that person views the photos, as shown at step 905.

4. E-Commerce

Figure 10:
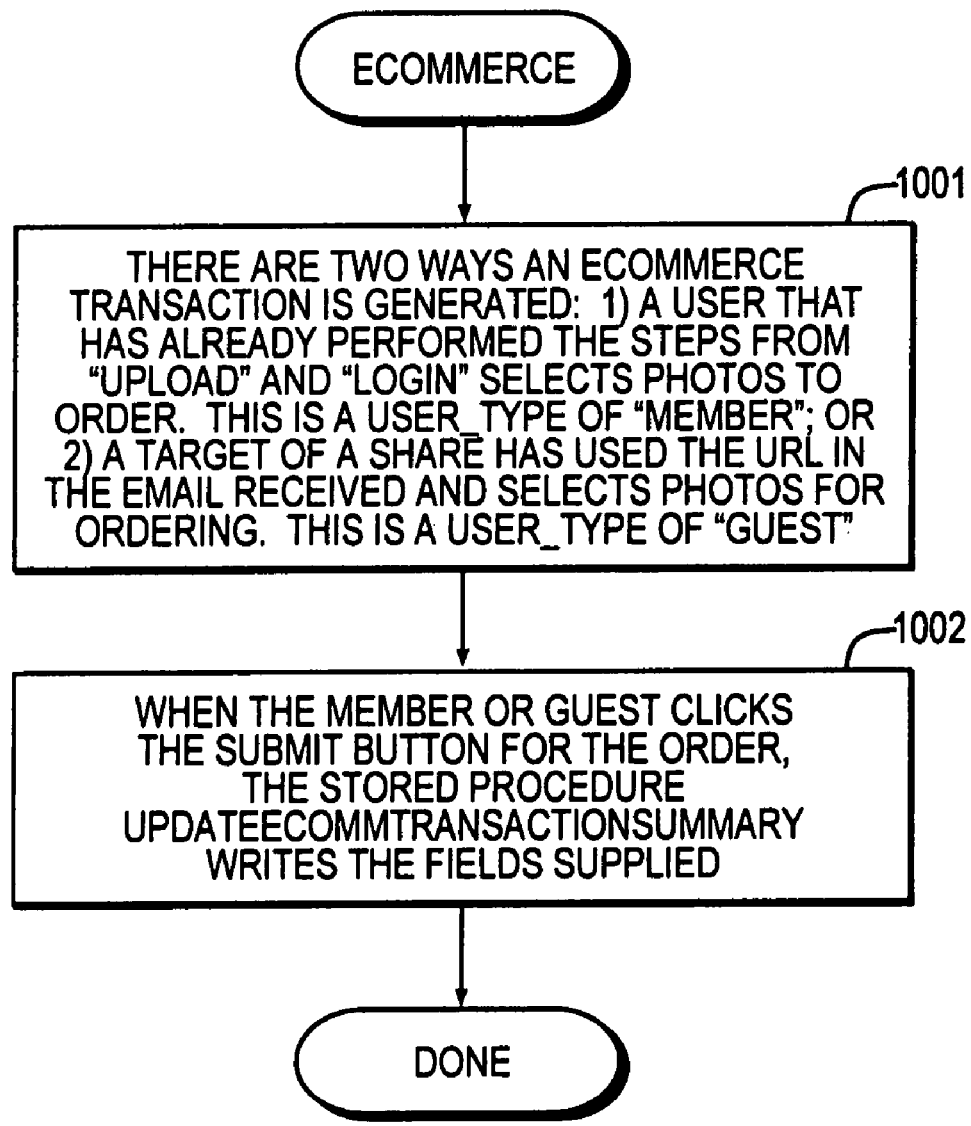
FIG. 10 is a flowchart illustrating the steps that occur that causes an entry to be posted to the ECOMM_TRANSACTION_SJJMMARY_T table.

FIG. 10 is a flowchart illustrating the steps that occur that causes an entry to be posted to the ECOMM_TRANSACTION_SUMMARY_T table. Step 1001 illustrates that there are typically two ways that an e-commerce transaction is generated. The first way consists of a user that has already performed the steps from "Upload" and "Login" selecting photos to order. This is a user_type of "MEMBER". The second way is when a target of a share has used the URL in the email received and selects photos for ordering. This is a user_type of "GUEST". As shown at step 1002, when the MEMBER or GUEST clicks the submit button for the order, the stored procedure UpdateEcommTransactionSummary writes the fields supplied.

G. Asset Tracking and Reporting

The media gateway transaction occurs every time a media asset, such as a photo, is uploaded to the site. Transactions can cause a debit or credit to be generated for the partner. Billing or crediting arrangements can be tracked through, for example, the PARTNER_ID field in the MEDIA_GATEWAY_TRANSACTION_LOG_T table. As an example of a credit, a wireless provider may have users that upload photos via a wireless link to the provider's site. The photos are uploaded to the site, assigned a storage location and a photo ID. Since this storage is expensive, how much storage all users for a partner are using is tracked at any time or date range. This cost, which may be charged or credited to various partners, may be calculated based on the following SQL query:

select transferred count from media_gateway_transaction_log_t where
    media_gateway_transaction_log_t.partner_id=123 and
    media_gateway_transaction_log_t.user_id=789

Each entry returned from the select statements would be summed. The total sum may be used to calculate what the partner must pay for storage (credit).

As an example of a debit, the photos that are uploaded to the site may be ordered by a particular user, for instance, for generating photographic prints. This generates an e-commerce transaction. The partner could be paid a percentage of the total order amount for every e-commerce transaction that the user's photo generated. This may be calculated based on the following SQL query:

select total_amount from ecom_transaction_summary_t where
    media_gateway_transaction_log_t.partner_id=123

Each entry returned from the select SQL statement would be summed. The total sum could be used to calculate what is paid to the partner (debit). Of course more complicated queries may be created. It is always possible to track an asset across multiple tables and transactions with the following frequently-used and common fields through the use of SQL join and select operations, for example, USER_ID, PHOTO_ID, and PARTNER_ID.

Consider the case where some of the PHOTO_IDs in an e-commerce order were uploaded by one partner's user and some of the PHOTO_IDs were uploaded through another partner's user (i.e., a different user, coming into the system through a different partner). The total dollar amount that a partner's users generated in e-commerce transactions is of particular interest. The tracking is possible, as demonstrated by the following SQL query:

```
select
    sum((item_quantity-free_item_quantity)*item_price),
    ets.partner_id
from
    order_item_t@prod           oi,
    ecom_transaction_summary_t  ets,
    media_gateway_trans_log_t   mgtl,
    photo_transaction_log_t     ptl
where
    ets.order_id = oi.order_id
    and ets.user_id = mgtl.user_id
    and ptl.media_gateway_trans_log_id =mgtl.media_gateway_trans_log_id
    and ptl.photo_id = oi.reference_id
group by partner_id;
```

This example demonstrates that assets are tracked all the way through the system. An upload is typically done at the beginning of the sequence and a PHOTO_ID and USER_ID are assigned. The e-commerce transaction typically happens after logins, shares, or the like and can occur quite a bit later in time. Still, all PHOTO_IDs are tracked through all tables. The information is maintained at a very fine level of granularity, which provides for a large number of possible business models. These are available for access from the ancillary (support) tables, including ORDER_T, ORDER_ITEM_T, and PHOTO_T.

H. Sample XML Reporting

Appended herewith as Appendix A are XML script listings illustrating XML-based reporting, in accordance with the present invention. These sample XML reports demonstrate that the asset management system of the present invention can track any level of granularity for a partner, including, for instance, tracking based on storage byte level, number of e-commerce transactions, number of uploads, time and duration of transactions, and the like. Additionally, the system can provide any level of summary statistics for a partner (e.g., any level of median, average, count, max, min, or the like) for all users the partner has. These statistics or metrics, in conjunction with debit/credits based on those metrics, support a wide variety of multi-partner business models necessary for success in today's e-commerce environment.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

APPENDIX A

XML Script Listings

With Accompanying DTD Listings Indicating
Possible Legal Values for XML Tags Employed userTrans.xml

```
<?xml version="1.0" encoding="iso-8859-1"?>
<!DOCTYPE PARTNER SYSTEM "userTrans.dtd">
<PARTNER report_type="transactions">
    <PARTNER_NAME >Absolutely Wireless Ltd.</PARTNER_NAME>
    <PARTNER_ID>444111</PARTNER_ID>
    <DATE_RANGE>
        <QUARTER>1</QUARTER>
        <START>01-Jan-2001</START>
        <END>31-Mar-2001</END>
    </DATE_RANGE>
    <NUMBER_OF_USERS>2</NUMBER_OF_USERS>
    <NUMBER_OF_CALLS>3</NUMBER_OF_CALLS>
    <TOTAL_TIME_OF_CALLS>00:09:53</TOTAL_TIME_OF_CALLS>
    <NUMBER_OF_ECOM_PURCHASES>2</NUMBER_OF_ECOM_PURCHASES>
    <TOTAL_BYTES_TRANSFERRED>8786000</TOTAL_BYTES_TRANSFERRED>
    <TOTAL_ECOM_PURCHASES>68.99</TOTAL_ECOM_PURCHASES>
    <TOTAL_TAX_ON_ECOM_PURCHASES>5.51<TOTAL_TAX_ON_ECOM_PURCHASES>
    <TOTAL_STORAGE_USED>68100000</TOTAL_STORAGE_USED>
    <USERS>
        <USER_ID id="123" external_id="A777">
            <CALL id="9753">
                <DATE>1-2-2001</DATE>
                <TIME>4:23:02</TIME>
                <DURATION>0:03:11</DURATION>
                <BYTES>2592000</BYTES>
                <MEDIA_TRANSFERS>4</MEDIA_TRANSFERS>
            </CALL>
        </USER_ID>
        <USER_ID id="123" external_id="A777">
            <CALL id="3455">
                <DATE>1-3-2001</DATE>
                <TIME>14:03:02</TIME>
                <DURATION>0:01:31</DURATION>
                <BYTES>1302000</BYTES>
                <MEDIA_TRANSFERS>2</MEDIA_TRANSFERS>
            </CALL>
        </USER_ID>
        <USER_ID id="123" external_id="A777">
            <ECOM order_id="84533">
                <DATE>1-8-2001</DATE>
                <TOTAL_AMOUNT>24.99</TOTAL_AMOUNT>
                <TOTAL_TAX>1.99</TOTAL_TAX>
            </ECOM>
        </USER_ID>
```

-continued

```
<USER_ID id="123" external_id="A777">
   <STORAGE_USED>44050000</STORAGE_USED>
</USER_ID>
<USER_ID id="456" external_id="A101">
   <CALL id="34987">
      <DATE>1-2-2001</DATE>
      <TIME>9:23:02</TIME>
      <DURATION>0:05:11</DURATION>
      <BYTES>4892000</BYTES>
      <MEDIA_TRANSFERS>7</MEDIA_TRANSFERS>
   </CALL>
</USER_ID>
<USER_ID id="456" external_id="A101">
   <ECOM order_id="none">
   </ECOM>
</USER_ID>
<USER_ID id="456" external_id="A101">
   <STORAGE_USED>12050000</STORAGE_USED>
</USER_ID>
<USER_ID id="888" external_id="Z345">
   <CALL id="none">
   </CALL>
</USER_ID>
<USER_ID id="888" external_id="Z345">
   <ECOM order_id="7272727">
      <DATE>1-8-2001</DATE>
      <TOTAL_AMOUNT>44.00</TOTAL_AMOUNT>
      <TOTAL_TAX>3.52</TOTAL_TAX>
   </ECOM>
</USER_ID>
<USER_ID id="888" external_id="Z345">
   <STORAGE_USED>12000000</STORAGE_USED>
</USER_ID>
</USERS>
</PARTNER>
``` userTrans.dtd
```
<!ELEMENT BYTES (#PCDATA)>
<!ELEMENT CALL (DATE?, TIME?, DURATION?, BYTES?, MEDIA_TRANSFERS?)>
<!ATTLIST CALL id NMTOKEN #REQUIRED>
<!ELEMENT DATE (#PCDATA)>
<!ELEMENT DATE_RANGE (QUARTER, START, END)>
<!ELEMENT DURATION (#PCDATA)>
<!ELEMENT ECOM (DATE?, TOTAL_AMOUNT?, TOTAL_TAX?)>
<!ATTLIST ECOM order_id NMTOKEN #REQUIRED>
<!ELEMENT END (#PCDATA)>
<!ELEMENT MEDIA_TRANSFERS (#PCDATA)>
<!ELEMENT NUMBER_OF_CALLS (#PCDATA)>
<!ELEMENT NUMBER_OF_ECOM_PURCHASES (#PCDATA)>
<!ELEMENT NUMBER_OF_USERS (#PCDATA)>
<!ELEMENT PARTNER (PARTNER_NAME, PARTNER_ID, DATE_RANGE, NUMBER_OF_USERS, NUMBER_OF_CALLS, TOTAL_TIME_OF_CALLS, NUMBER_OF_ECOM_PURCHASES, TOTAL_BYTES_TRANSFERRED, TOTAL_ECOM_PURCHASES, TOTAL_TAX_ON_ECOM_PURCHASES, TOTAL_STORAGE_USED, USERS)>
<!ATTLIST PARTNER report_type NMTOKEN #REQUIRED>
<!ELEMENT PARTNER_ID (#PCDATA)>
<!ELEMENT PARTNER_NAME (#PCDATA)>
<!ELEMENT QUARTER (#PCDATA)>
<!ELEMENT START (#PCDATA)>
<!ELEMENT STORAGE_USED (#PCDATA)>
<!ELEMENT TIME (#PCDATA)>
<!ELEMENT TOTAL_AMOUNT (#PCDATA)>
<!ELEMENT TOTAL_BYTES_TRANSFERRED (#PCDATA)>
<!ELEMENT TOTAL_ECOM_PURCHASES (#PCDATA)>
<!ELEMENT TOTAL_STORAGE_USED (#PCDATA)>
<!ELEMENT TOTAL_TAX (#PCDATA)>
<!ELEMENT TOTAL_TAX_ON_ECOM_PURCHASES (#PCDATA)>
<!ELEMENT TOTAL_TIME_OF_CALLS (#PCDATA)>
<!ELEMENT USERS (USER_ID+)>
<!ELEMENT USER_ID (CALL|ECOM|STORAGE_USED)*>
<!ATTLIST USER_ID external_id NMTOKEN #REQUIRED>
<!ATTLIST USER_ID id NMTOKEN #REQUIRED>
```
partnerSummary.xml

```
<?xml version="1.0" encoding="iso-8859-1"?>
<!DOCTYPE PARTNER SYSTEM "partnerSummary.dtd">
<PARTNER report_type="summary">
   <PARTNER_NAME>Digital Wireless Inc.</PARTNER_NAME>
   <PARTNER_ID>123987</PARTNER_ID>
   <DATE_RANGE>
      <QUARTER>1</QUARTER>
      <START>01-Jan-2001</START>
      <END>31-Mar-2001</END>
   </DATE_RANGE>
   <PARTNER_AGREEMENT>
      <AGREEMENT_ID number="B456">
         <DESCRIPTION>Debit of $1/month per gigabyte of storage</DESCRIPTION>
         <TOTAL_USERS>8750</TOTAL_USERS>
         <MEDIA_TRANSACTIONS>
            <TOTAL>131250</TOTAL>
            <AVERAGE_PER_USER>15</AVERAGE_PER_USER>
            <UPLOADED_BYTES>13125000000</UPLOADED_BYTES>
            <MINUTES>14835.5</MINUTES>
            <UPLOAD_STATS>
```

-continued

```
        <AVERAGE_PER_SEC>14745</AVERAGE_PER_SEC>
      </UPLOAD_STATS>
    </MEDIA_TRANSACTIONS>
    <DEBIT>$12.80</DEBIT>
  </AGREEMENT_ID>
  <AGREEMENT_ID number="A234">
    <DESCRIPTION>Credit of 1% of total ecomm orders</DESCRIPTION>
    <TOTAL_USERS>8750</TOTAL_USERS>
    <ORDERS>
      <NUMBER_OF_ORDERS>2000</NUMBER_OF_ORDERS>
      <AMOUNT>$30000</AMOUNT>
      <AVERAGE_AMOUNT>$15.00</AVERAGE_AMOUNT>
    </ORDERS>
    <CREDIT>$300</CREDIT>
  </AGREEMENT_ID>
  </PARTNER_AGREEMENT>
</PARTNER>
``` partnerSummary.dtd
<!ELEMENT AGREEMENT_ID (DESCRIPTION, TOTAL_USERS, MEDIA_TRANSACTIONS, DEBIT, ORDERS?, CREDIT?)>
<!ATTLIST AGREEMENT_ID number NMTOKEN #REQUIRED>
<!ELEMENT AMOUNT (#PCDATA)>
<!ELEMENT AVERAGE_AMOUNT (#PCDATA)>
<!ELEMENT AVERAGE_PER_SEC (#PCDATA)>
<!ELEMENT AVERAGE_PER_USER (#PCDATA)>
<!ELEMENT CREDIT (#PCDATA)>
<!ELEMENT DATE_RANGE (QUARTER, START, END)>
<!ELEMENT DEBIT (#PCDATA)>
<!ELEMENT DESCRIPTION (#PCDATA)>
<!ELEMENT END (#PCDATA)>
<!ELEMENT MEDIA_TRANSACTIONS (TOTAL, AVERAGE_PER_USER, UPLOADED_BYTES, MINUTES, UPLOAD_STATS)>
<!ELEMENT MINUTES (#PCDATA)>
<!ELEMENT NUMBER_OF_ORDERS (#PCDATA)>
<!ELEMENT ORDERS (NUMBER_OF_ORDERS, AMOUNT, AVERAGE_AMOUNT)>
<!ELEMENT PARTNER (PARTNER_NAME, PARTNER_ID, DATE_RANGE, PARTNER_AGREEMENT)>
<!ATTLIST PARTNER report_type NMTOKEN #REQUIRED>
<!ELEMENT PARTNER_AGREEMENT (AGREEMENT_ID+)>
<!ELEMENT PARTNER_ID (#PCDATA)>
<!ELEMENT PARTNER_NAME (#PCDATA)>
<!ELEMENT QUARTER (#PCDATA)>
<!ELEMENT START (#PCDATA)>
<!ELEMENT TOTAL (#PCDATA)>
<!ELEMENT TOTAL_USERS (#PCDATA)>
<!ELEMENT UPLOADED_BYTES (#PCDATA)>
<!ELEMENT UPLOAD_STATS (AVERAGE_PER_SEC)>

What is claimed is:

1. A method for tracking transactions involving media assets on a data network, said data network being serviced by multiple service providers, the method comprising:

tracking transaction information that allows for billing of an e-commerce transaction involving a plurality of services provided by the multiple service providers, the transaction information comprising service provider information, revenue sharing information, and asset information, wherein the tracking of the transaction information includes, tracking the service provider information, wherein the service provider information indicates which one of the multiple service providers performed a corresponding one of the plurality of services for a particular media asset, tracking the revenue sharing information among the multiple service providers for servicing the plurality of services of the e-commerce transaction, the revenue sharing information includes an amount of revenue share of the e-commerce transaction for a carrier that was used to upload the particular media asset, and in response to a particular media asset being uploaded to the media gateway associated with the data network, tracking the asset information, at a media gateway, wherein the asset information characterizes the particular media asset and the media gateway captures a plurality of media assets uploaded from a plurality of devices.

2. The method of claim 1, wherein the asset information additionally uniquely identities the asset within the data network, information specifying characteristics of the asset, and information identifying a particular user who uploaded the asset.

3. The method of claim 1, wherein said method further comprises:

generating a report indicating the one of the multiple service provider's billing information in connection with providing services for the various media assets present on the data network.

4. The method of claim 1, wherein asset information additionally uniquely identifies a particular device that the particular media asset was received from.

5. The method of claim 1, wherein said transaction information further includes billing information that allows for billing of the services provided by the multiple service providers and additionally allows for tracking of expense sharing among the multiple service providers.

6. The method of claim 1, wherein a request to engage for the e-commerce transaction is received from a first user other than a second user who uploaded the particular asset to the data network.

7. The method of claim 6, wherein the tracking information further comprises input indicating that the particular media asset may be shared with other particular users on the data network and information associated with a request from one of the other particular users to engage one or more of said service providers to perform one or more services for the particular media asset, wherein tracking transaction information allowing billing of the other particular user who requested the services.

8. A tracking system for tracking transactions involving media assets on a data network, said data network being serviced by multiple service providers, the system comprising:

a media gateway to capture a plurality oh media assets uploaded from a plurality of devices; and a tracking module to track transaction information that allows for billing of an e-commerce transaction involving a plurality of services provided by the multiple service providers, the transaction information comprising service provider information, revenue sharing information, and asset information, wherein the tracking module is configured to track the service provider information, wherein the service provider information indicates which one of the multiple service providers performed a corresponding one of the plurality of services for a particular media asset, to track the revenue sharing information among the multiple service providers for servicing the plurality of services of the e-commerce transaction, the revenue sharing information includes an amount of revenue share of the e-commerce transaction for a carrier that was used to upload the particular media asset, and to track the asset information in response to a particular media asset being uploaded to the media gateway, wherein the asset information characterizes the particular media asset.

9. The tracking system of claim 8, wherein the asset information additionally uniquely identifies the asset within the data network, information specifying characteristics of the asset, and information identifying a particular user who uploaded the asset.

10. The tracking system of claim 8, wherein said tracking system further comprises:
a report generation module to generate a report indicating the one of the multiple service provider's billing information in connection with providing services for the various media assets present on the data network.

11. The tracking system of claim 8, wherein asset information additionally uniquely identities a particular device that the particular media asset was received from.

12. The tracking system of claim 8, wherein said transaction information further includes billing information that allows for billing of the requested services provided by the multiple service providers and additionally allows for tracking of expense sharing among the multiple service providers.

13. The tracking system of claim 8, wherein a request to engage for the e-commerce transaction is received from a first user other than a second user who uploaded the particular asset to the data network.

14. The tracking system of claim 13, wherein the trucking information further comprises input indicating that the particular media asset may be shared with other particular users on the data network and information associated with a request from one of the other particular users to engage one or more of said service providers to perform one or more services for the particular media asset, wherein tracking transaction information allowing billing of the other particular user who requested the services.

15. A non-transitory machine-readable medium having executable instructions to cause one or more processing units to perform a method to track transactions involving media assets on a data network, said data network being serviced by multiple service providers, the method comprising:
tracking transaction information that allows for billing an e-commerce transaction involving a plurality of services provided by the multiple service providers, the transaction information comprising service provider information, revenue sharing information, and asset information, wherein the tracking of the transaction information includes,
tracking the service provider information, wherein the service provider information indicates which one of the multiple service providers performed a corresponding one of the plurality of services for a particular media asset,
tracking the revenue sharing information among the multiple service providers for servicing the plurality of services of the e-commerce transaction, the revenue sharing information includes an amount of revenue share of the e-commerce transaction for a carrier that was used to upload the particular media asset, and
in response to a particular media asset being uploaded to the media gateway associated with the data network, tracking the asset information, at a media gateway, wherein the asset information characterizes the particular media asset and the media gateway captures a plurality of media assets uploaded from a plurality of devices.

16. The non-transitory machine-readable medium of claim 15, wherein the asset information additionally uniquely identities the asset within the data network, information specifying characteristics of the asset, and information identifying a particular user who uploaded the asset.

17. The non-transitory machine-readable medium of claim 15, wherein said method further comprises:
generating a report indicating the one of the multiple service provider's billing information in connection with providing services for the various media assets present on the data network.

* * * * *